United States Patent
Oetlinger

(10) Patent No.: US 6,942,132 B2
(45) Date of Patent: *Sep. 13, 2005

(54) STIFFENING ASSEMBLY FOR STIFFENING THE LOWER FRAME ASSEMBLY OF A BLANKING TOOL

(76) Inventor: Frank E. Oetlinger, 1433 Fox La., Grafton, WI (US) 53024

(*) Notice: Subject to any disclaimer, the term of this patent is extended or adjusted under 35 U.S.C. 154(b) by 155 days.

This patent is subject to a terminal disclaimer.

(21) Appl. No.: 10/437,527

(22) Filed: May 14, 2003

(65) Prior Publication Data

US 2004/0020961 A1 Feb. 5, 2004

Related U.S. Application Data

(63) Continuation-in-part of application No. 10/288,731, filed on Nov. 6, 2002, and a continuation-in-part of application No. 10/197,188, filed on Jul. 17, 2002, now Pat. No. 6,712,254, and a continuation-in-part of application No. 10/197,176, filed on Jul. 17, 2002, now Pat. No. 6,715,953, and a continuation-in-part of application No. 10/197,190, filed on Jul. 17, 2002, now Pat. No. 6,796,474, and a continuation-in-part of application No. 10/164,478, filed on Jun. 6, 2002, now Pat. No. 6,708,858.

(51) Int. Cl.[7] .......................... B26F 3/00; B26H 35/10; B23Q 3/00; F16B 7/18
(52) U.S. Cl. .................. 225/104; 269/289 R; 403/343; 403/386; 403/387; 403/388; 403/403
(58) Field of Search .............................. 403/386–388, 403/374.1, 403, 374.2, 343, 374.3; 225/104, 90, 97; 269/289 R, 301, 309, 249; 493/143, 144, 199, 373

(56) References Cited

U.S. PATENT DOCUMENTS

| | | | |
|---|---|---|---|
| 4,111,579 A | * | 9/1978 | Knight ........................ 403/387 |
| 4,139,188 A | | 2/1979 | Avedian |
| 4,913,016 A | | 4/1990 | Frei |
| 6,019,358 A | | 2/2000 | Bernstein |
| 6,435,496 B1 | | 8/2002 | Phillips |
| 6,477,930 B1 | | 11/2002 | Sandford |
| 6,712,254 B2 | * | 3/2004 | Oetlinger ..................... 225/104 |

FOREIGN PATENT DOCUMENTS

FR  2604381 A1 * 4/1988  ........... F16C/29/02

* cited by examiner

Primary Examiner—Allan N. Shoap
Assistant Examiner—Isaac Hamilton
(74) Attorney, Agent, or Firm—Boyle Fredrickson Newholm Stein & Gratz S.C.

(57) ABSTRACT

A stiffening assembly is provided for stiffening an outer frame for a lower blanking tool of a carton die cutting machine to discourage the flexing thereof. The stiffening assembly includes an elongated rod and a clamping piece defining a vertically extending inner face, an opposite vertically extending outer face, and a bore extending between the inner face and the outer face along an axis at an acute angle to the outer face. A jaw element is operatively connected to the clamp piece so as to define a clamp cavity therebetween. The jaw element is movable between a clamping position for retaining a portion of the elongated rod in the clamp cavity and a release position.

27 Claims, 18 Drawing Sheets

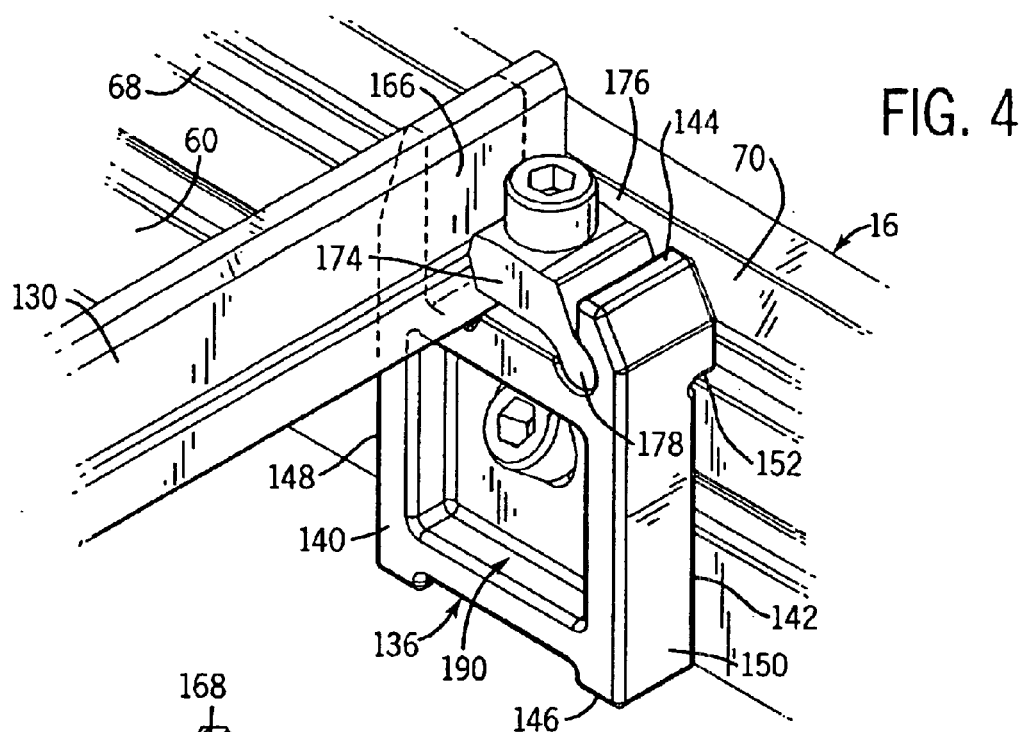
FIG. 4
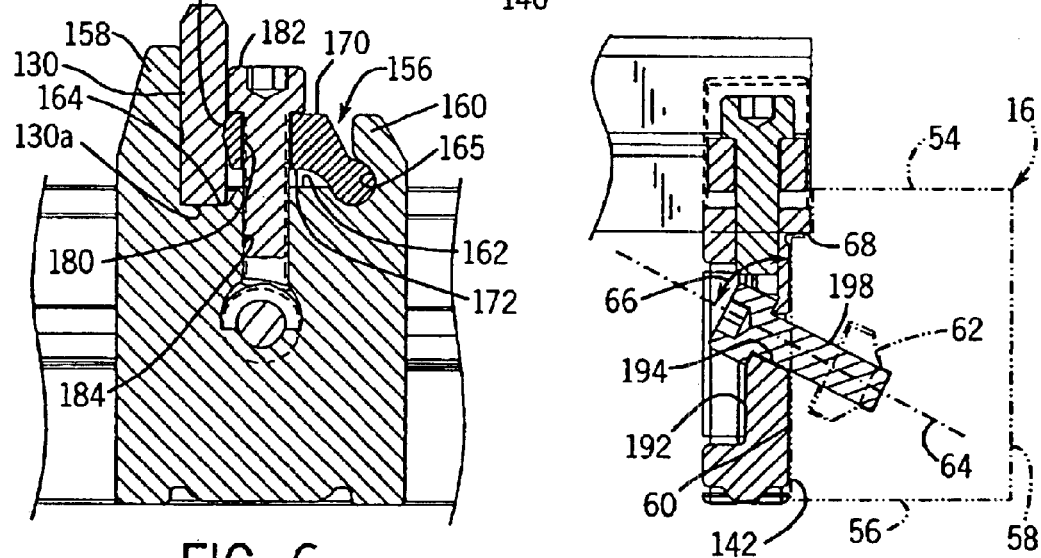
FIG. 6
FIG. 7
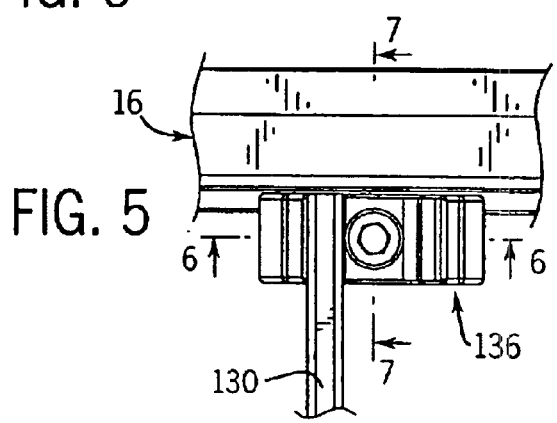
FIG. 5

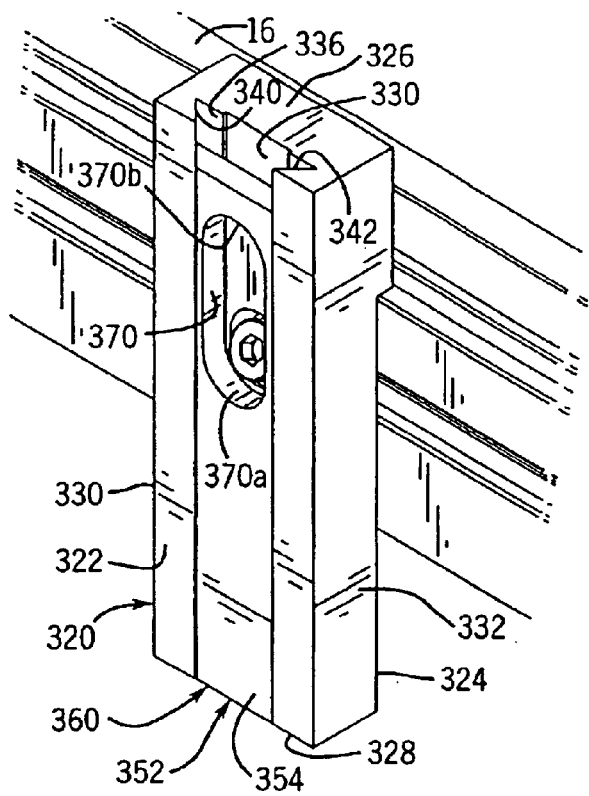
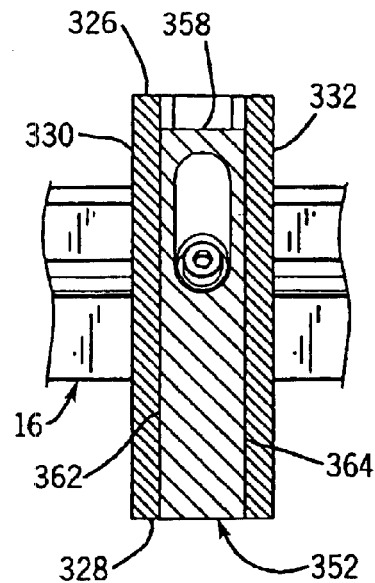
FIG. 11
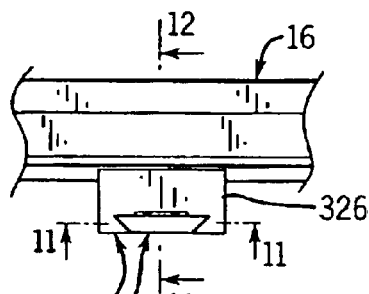
FIG. 8
FIG. 9
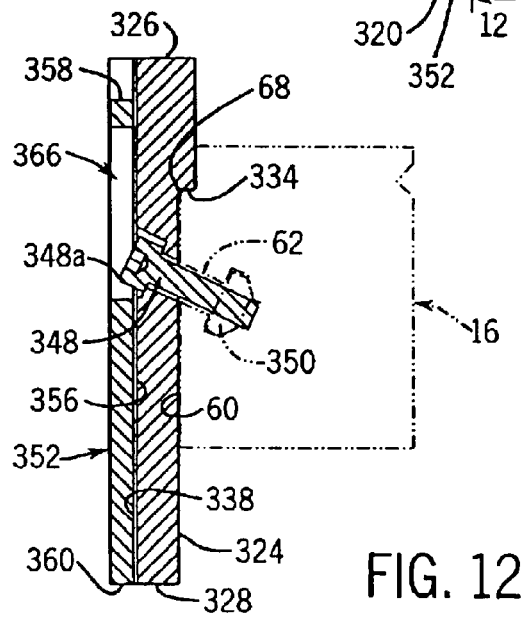
FIG. 10
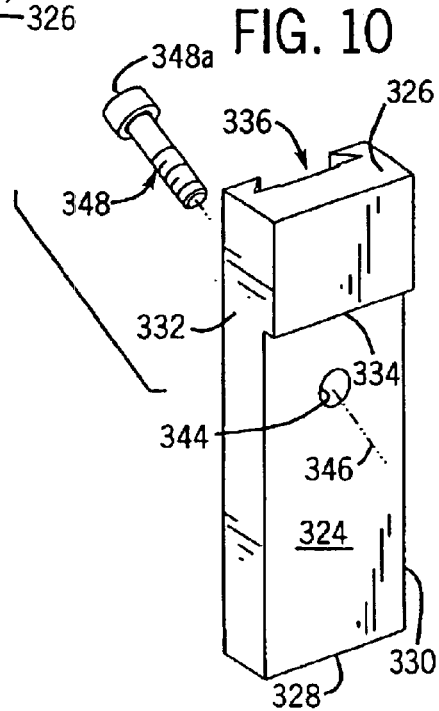
FIG. 12

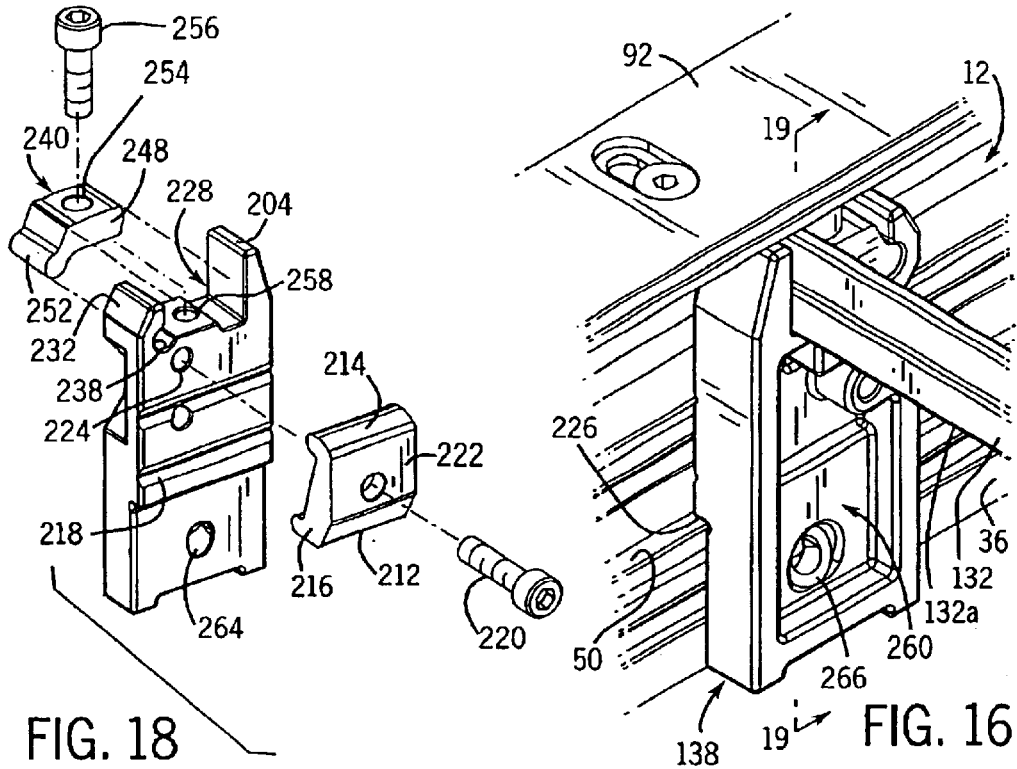
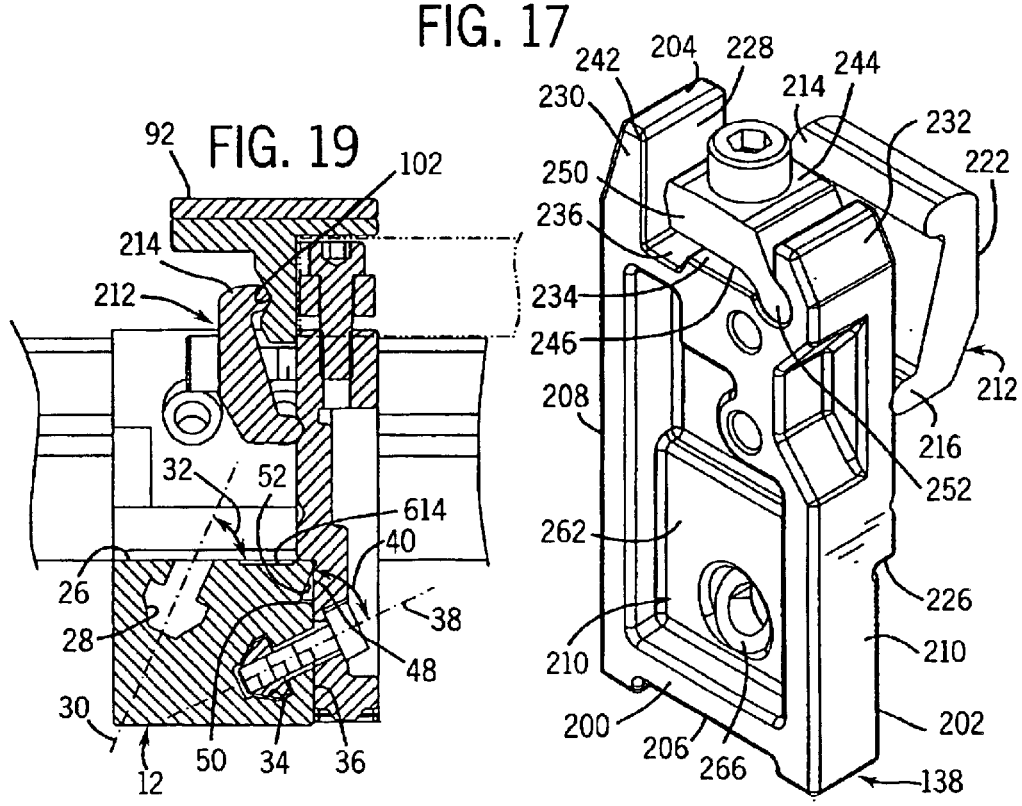

STIFFENING ASSEMBLY FOR STIFFENING THE LOWER FRAME ASSEMBLY OF A BLANKING TOOL

CROSS-REFERENCE TO RELATED APPLICATIONS

This case is a continuation-in-part of Ser. No. 10/164,478, filed Jun. 6, 2002, now U.S. Pat. No. 6,708,858, and entitled "*Clamp Pieces For Lower Frame Assembly of Blanking Tool;*" and a continuation-in-part of Ser. No. 10/197,188, filed Jul. 17, 2002, now U.S. Pat. No. 6,712,254, and entitled "*Stiffening Rail Support;*" and a continuation-in-part of Ser. No.: 10/197,176, filed Jul. 17, 2002, now U.S. Pat. No. 6,715,953, and entitled "*Panel Connection Device;*" and a continuation-in-part of Ser. No. 10/197,190, filed Jul. 17, 2002, now U.S. Pat. No. 6,796,474, and entitled "Jogger For Lower Frame Assembly Of Blanking Tool;" and a continuation-in part of Ser. No.: 10/288,731, filed Nov. 6, 2002 and entitled "*Connection Device For Interconnecting A Grid Element To Lower Frame Of A Blanking Tool.*

FIELD OF THE INVENTION

This invention relates generally to die cutting machines for making carton blanks, and in particular, to a stiffening assembly for stiffening the frame assembly for a lower blanking tool that supports carton scrap during a blanking operation in a die cutting machine.

BACKGROUND AND SUMMARY THE INVENTION

In the manufacture of cartons, small sheets of paper material having specific profiles are cut out of larger sheets of paper material. These smaller sheets are known as carton blanks that, in turn, are formed into cartons and/or boxes. The blanks are formed during a process known as a blanking operation in a die cutting machine.

In a die cutting machine, the blanks are cut, but not removed from a large sheet of paper material. After the blanks have been cut, the sheet is moved downstream in the die cutting machine to a blanking station where the sheet is positioned over a frame assembly for support. The frame assembly includes an outer frame and an inner grid having large openings that correspond in size, in shape and in position to the profile of the carton blank previously cut. Below the frame is a mechanism for stacking the carton blanks.

At the blanking station, an upper tool is used in combination with the lower tool or frame assembly to knock the carton blanks from the sheet of paper material while holding the scrap material that surrounds the blanks. The upper tool has a support board that moves vertically up and down in the die cutting machine, and the support board typically has a plurality of stand-offs depending therefrom that hold pushers spaced beneath the board which in turn are used to push the carton blanks from the sheet through the lower tool or frame assembly. A plurality of presser assemblies are also mounted in the support board and depend therefrom to hold the scrap material against the lower tool or frame assembly during the blanking operation so that the blanks may be pushed from the sheet. A presser assembly typically includes a presser rail that is biased downwardly away from the support board by a spring so that the rail is positioned slightly below the pushers. As the upper tool is lowered, the presser rail engages the sheet of paper material first such that a scrap portion of the large sheet of material is secured between the presser rail and the frame. The upper tool then continues to be lowered such that the sheet of material engages the inner grid within the frame while at substantially the same time the pushers engage the carton blanks and knock the blanks out of the sheet of material and through the inner grid. The carton blanks then fall into a stacking mechanism below the frame where the blanks are stacked for further processing.

The lower tool used in the blanking operation is typically comprised of a steel outer frame that supports an inner grid. The inner grid is typically comprised of a plurality of lengthwise and crosswise extending bars. In order to secure the inner grid in place on the outer frame, the ends of each bar are typically screwed onto attachment pieces that, in turn, are mounted on the lengthwise and crosswise rails of the outer frame. A grid element is positioned on the inner grid to define a pattern that conforms to the die cut in the sheet of paper material. It can be appreciated the inner grid must be reconfigured and the grid element must be replaced whenever a different carton blank needs to be produced. Thus, the disassembly of the inner grid from the outer frame and the grid element from the inner grid oftentimes becomes very cumbersome and time consuming. Thus, it is desirable to provide a quicker manner of attaching and removing the grid element from the inner grid.

Therefore, it is a primary object and feature of the present invention to provide an improved stiffening assembly for stiffening a frame assembly for a lower blanking tool of a carton die cutting machine to reduce flexing of the frame assembly during a blanking operation.

It is a further object and feature of the present invention to provide a stiffening assembly for stiffening a frame assembly for a lower blanking tool that may be easily attached and removed from the frame assembly.

It is a still further object and feature of the invention to provide a stiffening assembly for stiffening a frame assembly for a lower blanking tool which is compatible with standard blanking operation machinery and which is relatively inexpensive.

In accordance with the present invention, a stiffening assembly is provided for attaching a stiffening rail to the outer frame for a lower blanking tool of a carton die cutting machine to discourage the flexing thereof. The stiffening assembly includes an elongated rod and a clamp piece defining a vertically extending inner face, an opposite vertically extending outer face, and a bore extending between the inner face and the outer face along an axis at an acute angle to the outer face. A jaw element is operatively connected to the clamp piece so as to define a clamp cavity therebetween. The jaw element is movable between a clamping position for retaining a portion of the elongated rod in the clamping cavity and a release position.

The jaw element includes a first clamping surface engageable with the elongated rod when the jaw element is in the clamping position. The jaw element includes a second clamping surface that is engageable with the clamping piece when the jaw element is in the clamping position. The first and second clamping surfaces of the jaw element are generally arcuate and include apexes.

The stiffening assembly may also include a screw member for moving the jaw element between the clamping position and the release position. In addition, the acute angle of the bore between the inner and outer face is in the range of 30 degrees and 80 degrees. Preferably, the acute angle is approximately 65 degrees. It is contemplated to provide a lip in the outer face of the clamp piece. The lip is engageable with a corresponding ledge along the outer frame to support the clamp piece thereon. A fastening element extends through the bore in the clamp piece and is receivable in a corresponding slot in the outer frame to interconnect the clamp piece to the outer frame. A recess slot may be provided in the inner face of the clamp member to slidably receive a jogger disposed therein. In addition, the outer face of the clamp piece may include a semi-cylindrical indentation therein for receiving a portion of the elongated rod therein.

In accordance with a further aspect of the present invention, a stiffening assembly is provided for stiffening the outer frame of a lower blanking tool of a carton die cutting machine to discourage the flexing thereof. The stiffening assembly includes an elongated stiffening member and a plate member. The plate member defines inner and outer faces and a bore extending between the inner and outer face along an axis at an acute angle to the outer face. A clamping structure is operatively connected to the plate member and is movable between a clamping position for rigidly retaining a portion of the stiffening member against the plate member and a release position.

The inner face of the plate member defines a recessed slot therein for slidably receiving a jogger. The clamping structure includes a jaw element having a first clamping surface engageable with the stiffening member when the clamping structure is in the clamping position and a second clamping surface engageable with the plate member when the clamping structure is in the clamping position. The first and second clamping surfaces of the jaw element are generally arcuate and include apexes. A screw member moves the clamping structure between the clamping and the release positions.

It is contemplated that the bore extend between the inner and outer face at an angle in the range of 30 degrees and 80 degrees. Preferably, the angle of the bore is approximately 65 degrees. It is further contemplated to provide the outer face of the plate member with a lip. The lip is engageable with a corresponding ledge along the outer frame to support the plate member thereon. In addition, the outer face of the clamp piece may include a semi-cylindrical indentation therein for receiving a portion of the stiffening member therein.

In accordance with a further aspect of the present invention, a frame assembly is provided for a lower blanking tool of a carton die cutting machine. The frame assembly includes a rigid outer frame having a slot therein. A stiffening member extends along an axis and is generally parallel to at least a portion of the outer frame. A stiffening member support interconnects the stiffening member to the outer frame. The stiffening member support includes a plate member defining an inner face, outer face and a bore extending between an inner face and an outer face along an axis at an acute angle of the outer face. A clamping structure is operatively connected to the plate member and is movable between a clamping position for rigidly retaining a portion of the stiffening member against the plate member and a release position. A fastening element extends through the bore in the plate member and is receivable in the slot in the outer frame to interconnect the plate member to the outer frame.

The acute angle of the bore extending through the plate member is in the range of 30 degrees and 80 degrees, and preferably, is approximately 65 degrees. The inner face of the plate member defines a recessed slot therein wherein a jogger may be slidably disposed. The clamping structure includes a jaw element having a first clamping surface engageable with the stiffening member when the clamping structure is in the clamping position and a second clamping surface engageable with the plate member when the clamping structure is in the clamping position. The first and second clamping surfaces of the jaw element are generally arcuate and include apexes. In addition, the outer face of the clamp piece may include a semi-cylindrical indentation therein for receiving a portion of the stiffening member therein.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 4 is an enlarged, isometric view illustrating a clamp device for attaching a bar of the inner grid to the outer frame of the lower frame assembly of FIG. 1;

FIG. 5 is a top plan of the clamp device for attaching a bar of the inner grid to the outer frame of the lower frame assembly of FIG. 1;

FIG. 6 is a cross-sectional view of the clamp device taken along line 6—6 of FIG. 5;

FIG. 7 is a cross-sectional view of the clamp device taken along line 7—7 of FIG. 5;

FIG. 8 is an enlarged, isometric view illustrating a jogger mounting to the outer frame of the lower frame assembly of FIG. 1;

FIG. 9 is a top plan view of the jogger mounted to the outer frame of the lower frame assembly of FIG. 8;

FIG. 10 is an exploded, isometric view of the jogger of FIG. 8;

FIG. 11 is a cross-sectional view of the jogger mounted to the outer frame of the lower frame assembly taken along line 11—11 of FIG. 9;

FIG. 12 is a cross-sectional view of the jogger mounted to the outer frame of the lower frame assembly taken along line 12—12 of FIG. 9;

FIG. 16 is an enlarged, isometric view illustrating a stiffening rail clamp mounted to the outer frame of the lower frame of FIG. 1;

FIG. 17 is an isometric view of the stiffening rail clamp of FIG. 13;

FIG. 18 is an exploded, isometric view of the stiffening rail clamp of FIG. 13;

FIG. 19 is a cross-sectional view of the stiffening rail clamp mounted to the outer frame of the lower frame assembly taken along line 19—19 of FIG. 16;

DETAILED DESCRIPTION OF THE PREFERRED EMBODIMENT

Figure 1:
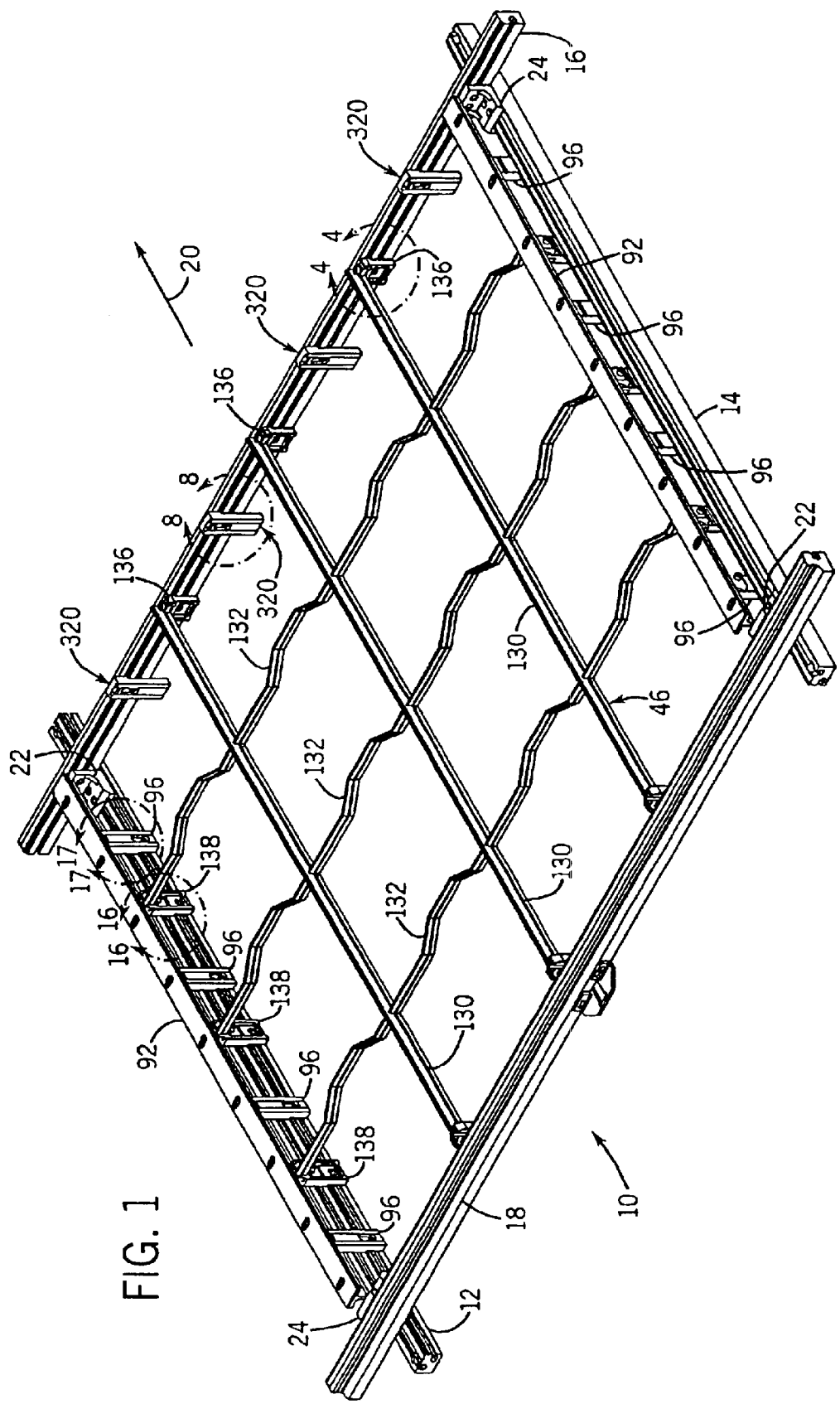
FIG. 1 is an isometric view of a lower frame assembly for a blanking tool of a carton die cutting machine.
Figure 2:
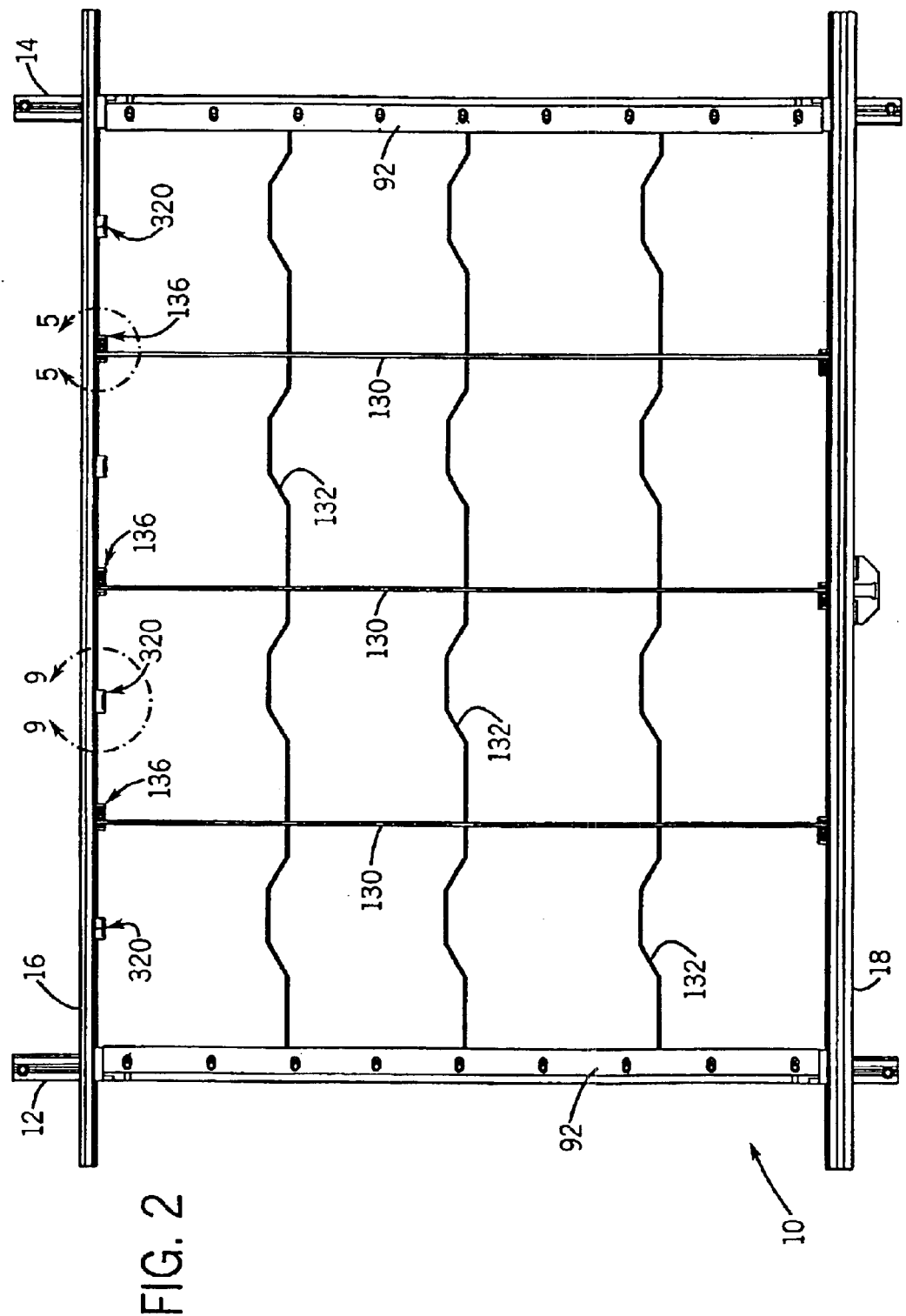
FIG. 2 is a top plan view of the lower frame assembly of FIG. 1.

Referring to FIG. 1, a lower frame assembly for a blanking tool of a carton die cutting machine is generally designated by the numeral 10. As is known, a die cutting machine converts or processes a sheet of paper material into a carton blank. These machines are well known in the art and are used to cut one or several blanks into each sheet of paper material which, after folding and gluing, may be formed into cartons or boxes. As is conventional, the sheets of paper material move in a substantially horizontal plane within the machine and are carried through various sequences of printing, cutting, embossing, creasing, waste stripping and/or blanking stations.

The die cutting machine usually is formed by a series of stations with tile first station being a starting position or input station in which the sheets, which may be preprinted if desired, are taken one by one from the top of a stack to a feed table where they are placed in position against frontal and side guides. The sheet can then be grasped by a gripper bar and lead downstream or in the machine direction into subsequent processing stations. Typically, the sheet is first conveyed into a cutting station where the carton or box blanks of a desired size and profile are die cut into the sheet. These blanks are held to the sheet by knicks which are arranged along the cut edges of the blanks. This cutting station is usually comprised of upper and lower tools, one of which is provided with a plurality of line-shaped straight and curved die cutting blades. If desired, the cutting station may be proceeded by a printing station, or as noted above, the sheets may be preprinted. After cutting, the sheet is then lead to a stripping station where the waste, i.e., the unused scrap between the various blanks, is grasped by upper and lower pins in order to be lead downward into a waste container. The sheet is then fed to a blanking station where the sheet is positioned horizontally over a lower frame for support. The lower frame includes an inner grid having large openings that correspond in size, in shape and in position to the profile of the blank previously cut. An upper blanking tool having one or more presser assemblies mounted thereto then moves vertically downwardly in the die cutting machine to secure the scrap portions against the grid and frame and then, as the tool continues to move downwardly, the fasten points or knicks between the blanks and the sheet are broken by pushers so that each of the blanks are released, pushed through the grid and falls below the frame where the blanks are stacked for further processing. Finally, the residual or remaining portion of the sheet is carried to a delivery or exit station where it is released by the gripper bar as waste material.

Referring back to FIG. 1, lower frame assembly 10 includes an outer frame comprised of a pair of opposite, spaced apart longitudinally extending side frame members or side rails 12 and 14, and a pair of opposite, spaced apart cross frame members or cross rails 16 and 18 extending crosswise between side rails 12 and 14. Arrow 20 illustrates the machine direction, i.e. the direction of movement of a sheet of paper material (not shown) within the die cutting machine. Thus, as illustrated in FIG. 1, side rail 12 may be considered the left side rail while side rail 14 may be considered the right side rail. Likewise, cross rail 16 may be considered the front or leading cross rail, while cross rail 18 may be considered the rear or trailing cross rail. As illustrated, cross rails 16 and 18 are of sufficient length such that the opposite ends of cross rails 16 and 18 overlap corresponding opposite ends of side rails 12 and 14. In addition, it is contemplated that cross rails 16 and 18 be disposed on top of side rails 12 and 14 so that the lower surface of cross rails 16 and 18 abut against the upper surfaces of side rails 12 and 14.

Figure 3:
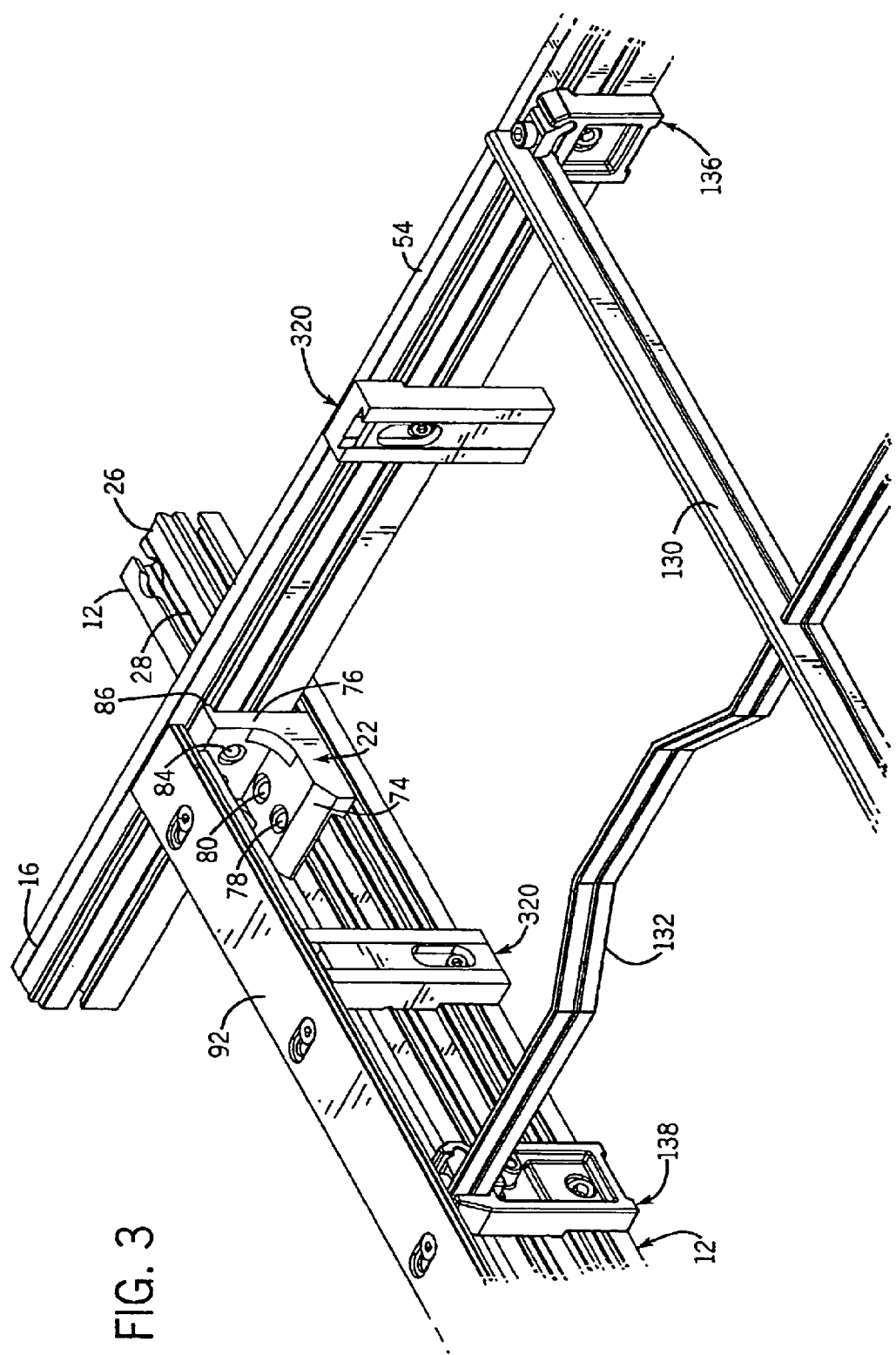
FIG. 3 is an enlarged, isometric view of a corner of the lower frame assembly of FIG. 1.
Figure 13:
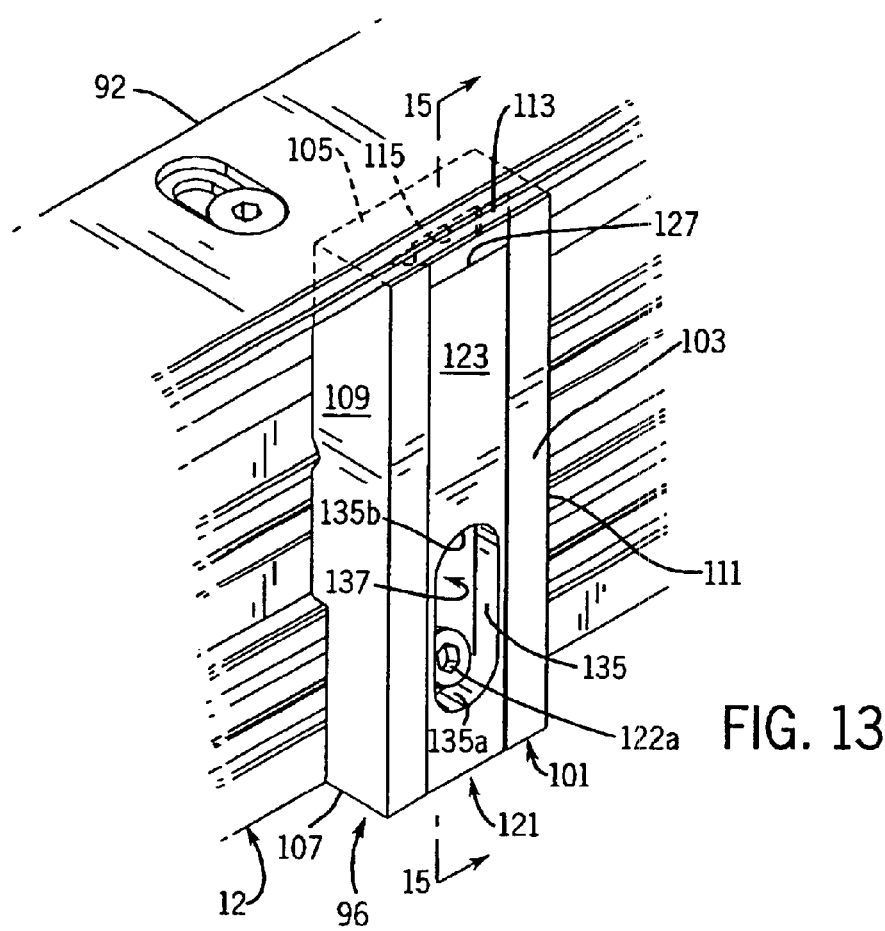
FIG. 13 is an enlarged, isometric view illustrating a stiffening rail support mounted to the outer frame of the lower frame assembly of FIG. 1.
Figure 14:
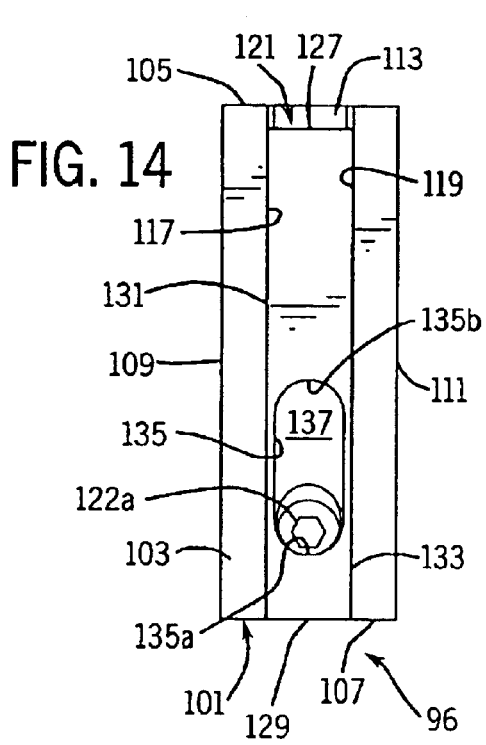
FIG. 14 is a front, elevational view of the stiffening rail support of FIG. 13.
Figure 15:
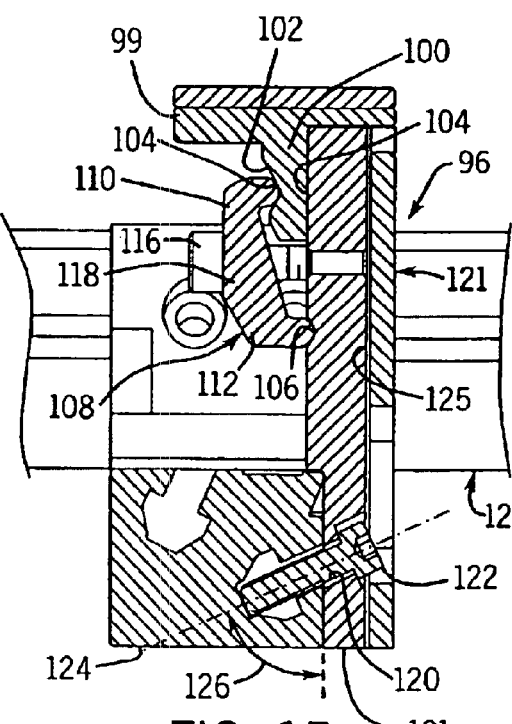
FIG. 15 is a cross-sectional view of the stiffening rail support mounted to the outer frame of the lower frame assembly taken along line 13—13 of FIG. 11.
Figure 20:
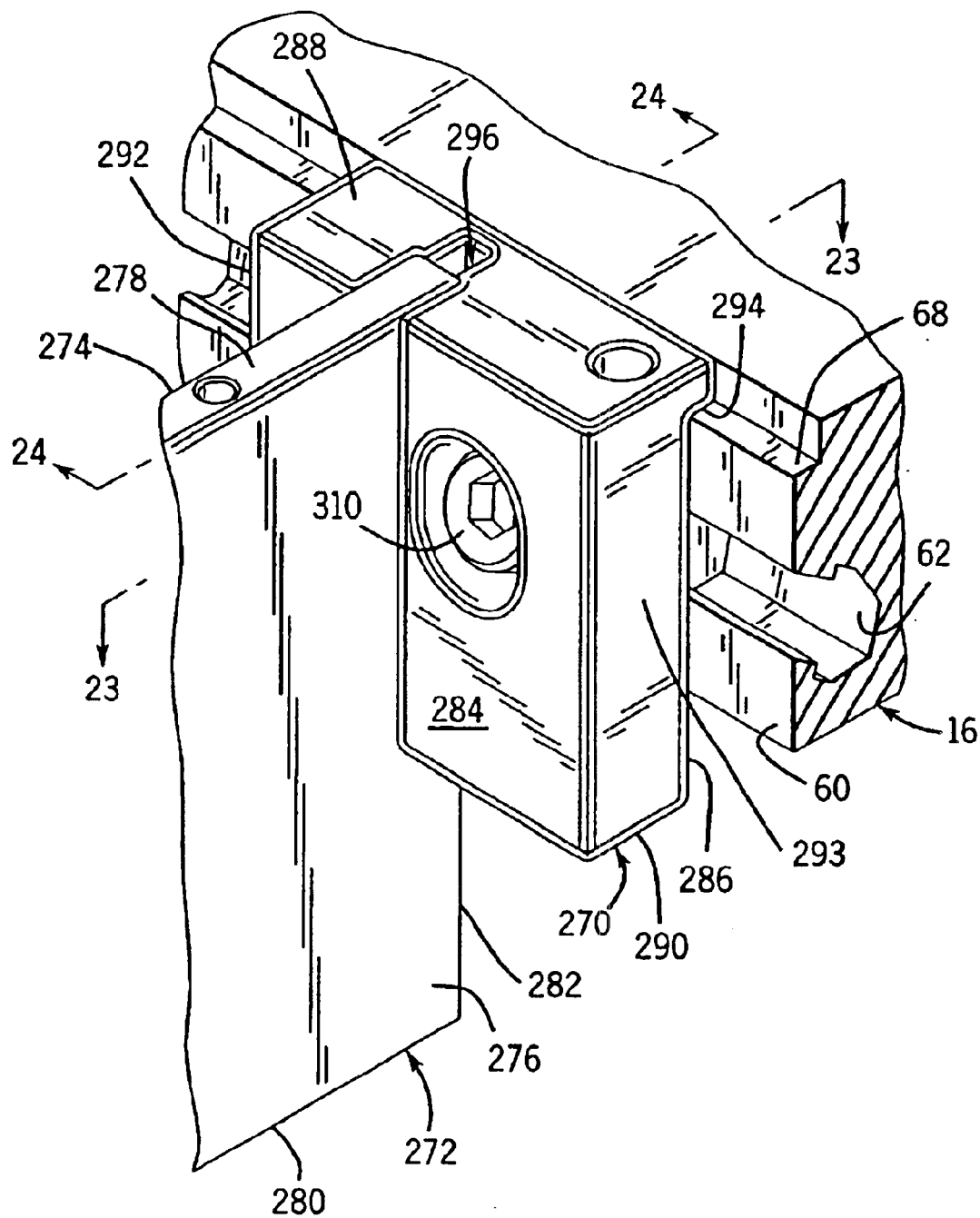
FIG. 20 is an enlarged, isometric view illustrating a bar support mounted to the outer frame of the lower frame of FIG. 1.
Figure 21:
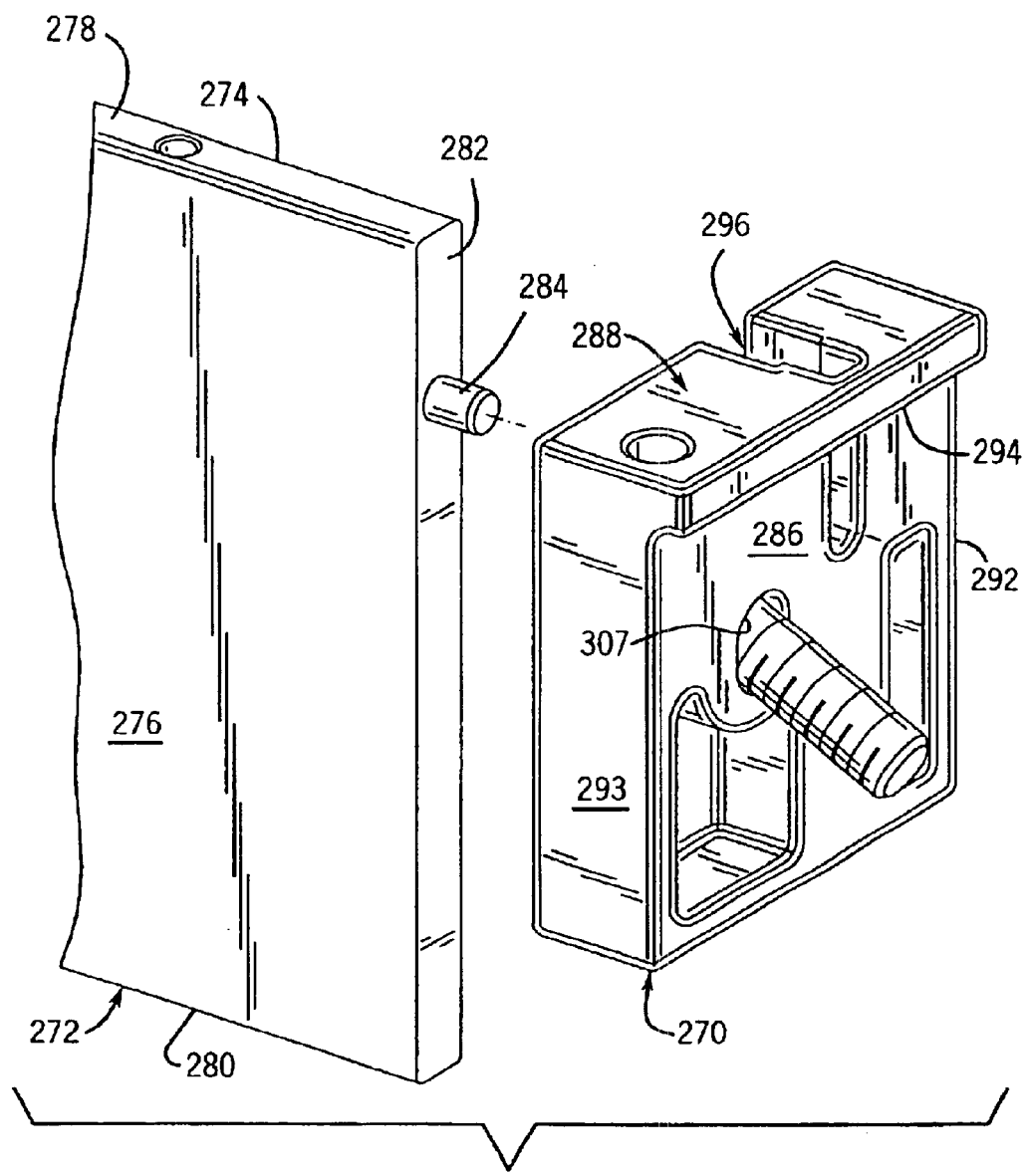
FIG. 21 is a partially exploded, isometric view of the bar support of FIG. 20 and associated bar.
Figure 22:
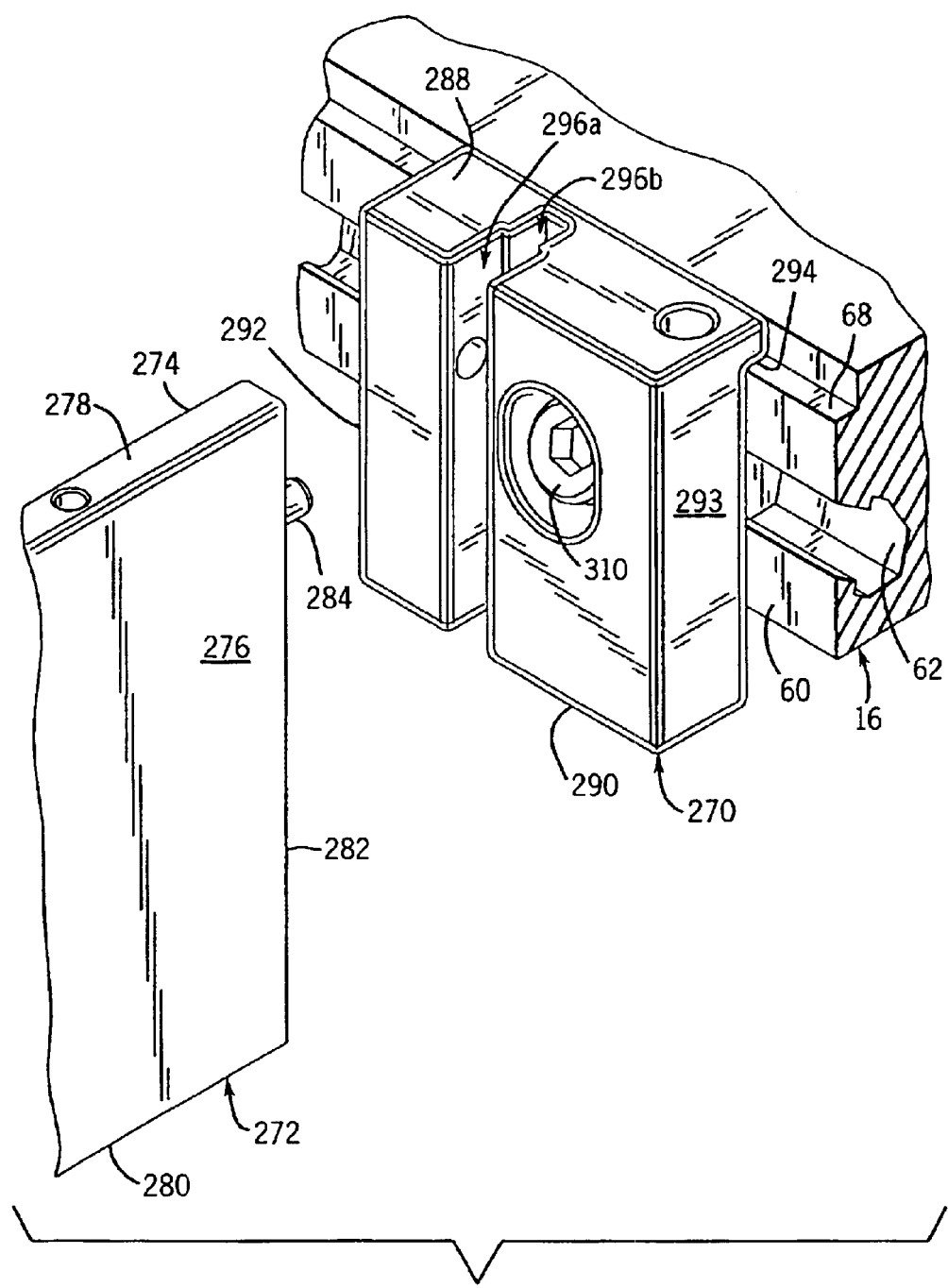
FIG. 22 is a partially exploded, isometric view of the bar support mounted to the outer frame of the lower frame of FIG. 1 and an associated bar.
Figure 23:
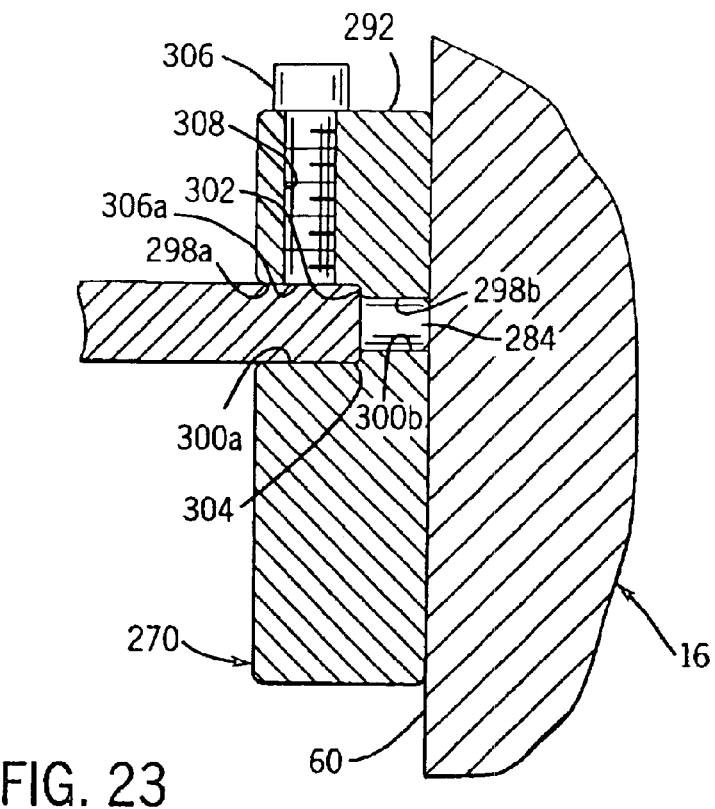
FIG. 23 is a cross-sectional view of the bar support mounted to the outer frame of the lower frame assembly taken along line 23—23 of FIG. 20.
Figure 24:
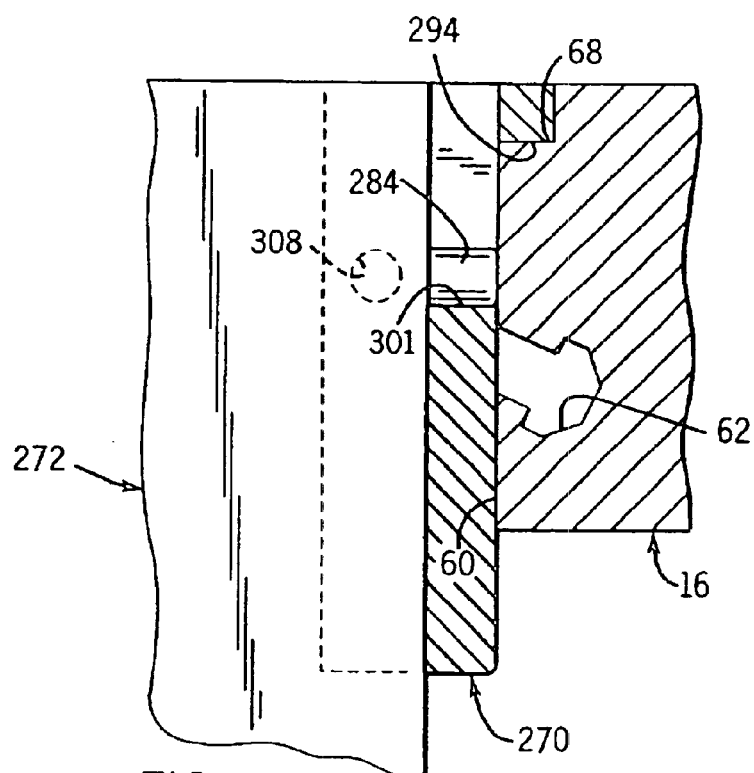
FIG. 24 is a cross-sectional view of the bar support mounted to the outer frame of the lower frame assembly taken along line 24—24 of FIG. 20.

As best seen in FIGS. 1 and 3, side rail 12 is rigidly interconnected to cross rails 16 and 18 by a pair of corner pieces 22 and 24, respectively. Similarly, side rail 14 is rigidly interconnected to cross rails 16 and 18 by corner pieces 24 and 22, respectively. Corner pieces 22 are hereinafter referred to as right corner pieces while corner pieces 24 are hereinafter referred to as left corner pieces. The terms "right" and "left" refer to the location of a tenon on the underside of each corner piece. It can be appreciated that left corner pieces 24 are essentially mirror images of right corner pieces 22. Corner pieces 22 and 24 are used to rigidly interconnect rails 12, 14, 16 and 18 to one another so as to retain rails 12, 14, 16 and 18 together in a "square" or 90° relationship.

Side rails 12 and 14 are identical in structure, and as such, the description hereinafter of side rail 12 is understood to described side rail 14 as if fully described herein. In addition, side rails 16 and 18 are identical in structure, and as such, the description hereinafter of side rail 16 is understood to described side rail 18 as if fully described herein. Side rail 12 extends along a longitudinal axis and includes upper surface 26 lying in a plane. Upper surface 26 of side rail 12 includes t-shaped slot 28 therein that extends along the entire length thereof. As best seen in FIG. 19, slot 28 extends along an axis 30 disposed at an acute angle 32 to upper surface 26 of side rail 12. It is contemplated that angle 32 fall within the range of 1° and 89°, but is preferably between about 30° to about 80° and is most preferably about 65°. Slot 28 has a terminal end located within side rail 12 and has an open end that opens to upper surface 26 of side rail 12.

Side rail 12 further includes second t-shaped slot 34 formed along the entire length of inner surface 36 of side rail 12. Inner surface 36 of side rail 12 lies in plane that is generally perpendicular to upper surface 26 of side rail 12. Slot 34 extends along an axis 38 disposed at an acute angle 40 with respect to inner surface 36. Angle 40 may be any angle between about 1° to about 89°, but is preferably between about 30° to about 80° and is most preferably about 65°. Slot 34 is identical in structure to slot 28 and extends along the entire length of side rail 12. As illustrated, slot 34 has a terminal end located within side rail 12 and an open end which opens to inner surface 36 of side rail 12. The terminal end of slot 34 (as well as the terminal end of slot 28) is configured to conform to the shape of nuts 42 captured therein, for reasons hereinafter described.

Side rail 12 further includes a channel-shaped recess 44 formed in upper surface 26 thereof. Recess 44 is formed in upper surface 26 between slot 28 and the intersection of upper surface 26 and inner surface 36 and functions to receive a ruler or other measuring device to aid in building an inner grid 46 within rails 12, 14, 16 and 18, as hereinafter described. Recess 44 is formed along the entire length of upper surface 26 of side rail 12 and opens to both of the opposite ends thereof.

Side rail 12 also includes an angled groove 48 formed in inner surface 36 above slot 34. Groove 48 is formed along the entire length of inner surface 36 of side rail 12 and opens to both of the opposite ends thereof. As illustrated, groove 48 is defined by inwardly projecting ledge 50 and angled surface 52. Ledge 50 has a planar surface and is disposed at an angle of about 90° with respect to inner surface 36. Other acute angles for ledge 40 may be used, but 90° is preferred. Angled surface 52 forms an acute angle with ledge 50 that falls in the range of approximately about 30° to about 80°, but is preferably about 70°. Groove 48 functions to receive a tenon of corresponding corner pieces 22 and 24.

Referring now to FIGS. 3–4, 7–8 and 12, cross rail 16 includes an upper surface 54, an opposite lower surface 56, an outer surface 58, and an opposite inner surface 60. Inner surface 60 is generally planer and faces the interior of frame assembly 10. Cross rail 16 includes a t-shaped slot 62 formed therein. Slot 62 extends along the entire length of inner surface 60 of cross rail 16 and opens to both of the opposite ends of cross rail 16. Slot 62 has a terminal end located within the interior of cross rail 16 and has an open end that opens to inner surface 60 of side rail 60. The terminal end of slot 62 is configured to conform to the shape of nuts 72 captured therein, for reasons hereinafter described. Slot 62 defines a downwardly extending axis 64 disposed at an acute angle 66 with respect to inner surface 60 of cross rail 16. It is contemplated that angle 66 fall in the range of 1° and 89°, but is preferably an angle of about 30° to about 80°, and is most preferably about 65°.

Cross rail 16 also includes an inwardly projecting ledge 68 formed in inner surface 60. Ledge 68 is planar in shape and is disposed at an angle of 90° with respect to inner surface 60. However, ledge 68 could also be modified to be at an acute angle with respect to inner surface 60 if desired.

As shown, ledge 68 is located at the intersection of the upper surface 54 and inner surface 60 of cross rail 16 such that ledge 68 is located between upper surface 54 and t-shaped slot 62. Ledge 68 extends along the entire length of cross rail 16 and opens to both of the opposite ends of cross rail 16 in a maimer similar to slot 62. Cross rail 16 further includes a channel-shaped recess 70 formed in upper surface 54. Recess 70 is formed in and extends along the entire length of cross rail 16 and opens to both of the opposite ends of cross rail 16. Recess 70 is typically utilized to receive a ruler or other measuring device that aids in the proper placement of inner grid 46.

Referring back to FIG. 3, corner piece 22 interconnects side rail 12 and front cross rail 16 of the lower frame assembly 10, and includes an L-shaped body having a horizontal plate member 74 and an upright or vertical plate member 76. Horizontal plate member 74 defines a substantially flat upper face, a substantially flat opposite lower face, an inside face, an opposite outside face and an end face. As illustrated, each of these faces are substantially planar in shape. Upright or vertical plate member 76 also defines a substantially flat inner face contiguous with the upper face of plate member 74, a substantially flat outer face contiguous with the lower face of plate member 74, an inside face contiguous with the inside face of horizontal plate member 74, an opposite outside face contiguous with the outside face of horizontal plate member 74, and a top face. Horizontal plate member 74 has a pair of adjacent, aligned outwardly and downwardly extending bolt receiving bores formed therethrough extending between its upper face and lower face. Each bore defines an axis disposed at an acute angle with respect to the upper face of horizontal plate member 74. It is preferred that the acute angle fall in the range of 1° and 89°, but preferably between about 30° and about 80°, and is most preferably about 65°. Bolts 78 and 80 extend through bores in horizontal plate member 74 into slot 28 in upper surface 26 of side rail 12. Nuts are provided within the terminal end of the slot 28 in upper surface 26 of side rail 12 and threaded onto the shafts of bolts 78 and 80 so as to rigidly connect corner piece 22 to side rail 12.

Upright or vertical plate member 76 of corner piece 22 also includes a pair of adjacent, aligned outwardly and downwardly extending bolt receiving bores formed therethrough from its inner face to its outer face through which bolts 84 extend into slot 62 in inner surface 60 of cross rail 16. Each bore defines an axis disposed at an acute angle with respect to the inner face of vertical plate member 76. Again, this acute angle may be anywhere between 1° and 89°, but is preferably between about 30° and about 80°, and is most preferably about 65° to match angle 66 of slot 62. Nuts are provided within the terminal end of the slot 62 in inner surface 60 of cross rail 16 and threaded onto the shafts of bolts 84 so as to rigidly connect corner piece 22 to cross rail 16.

Vertical plate member 76 has a lip 86 projecting outwardly therefrom. Lip 86 has an upper surface and a lower surface. The upper surface of lip 86 is contiguous with the top face of vertical plate member 76 while its lower surface is contiguous with the outer face of vertical plate member 76. Lip 86 is disposed substantially 90° with respect to the outer face of vertical plate member 76, and lip 86 extends completely across the outer face of vertical plate member 76. Although illustrated as being contiguous with the top face of vertical plate member 76, lip 86 could also be spaced slightly downwardly therefrom if desired. Also, lip 86 need not necessarily extend completely across the outer face of vertical plate member 76, but preferably does so to provide the maximum amount of clamping force against ledge 68.

Corner piece 22 also includes a tenon 88 projecting downwardly from horizontal plate member 74. Tenon 88 has an angled surface disposed at an acute angle with respect to the lower face of plate member 74. This acute angle may be any angle between 1° and 89°, but preferably matches the angle formed by angled surface 50 of groove 48 in side rail 12. Again, by matching the angle of angled surface 50, the maximum amount of friction is provided between tenon 88 of corner piece 22 and angled surface 50 to provide the maximum amount of clamping force.

It can be appreciated that a right corner piece 22 may be used to interconnect side rail 14 and cross rail 18 in the same manner as heretofore described with respect to side rail 12 and cross rail 16. In addition, as heretofore described, left corner pieces 24 are mirror images of right corner pieces 22. As such, the description heretofore provided for interconnecting side rail 12 and cross rail 16 with corner piece 22 may be understood to describe the connection of side rail 12 and cross rail 18 with corner piece 24 and the connection of side rail 14 and cross rail 16 with corner piece 24, as if fully described herein.

In order to increase the overall strength and stability of lower frame assembly 10, it is contemplated to interconnect stiffening rails 92 to corresponding side rails 12 and 14, respectively, utilizing a plurality of stiffening rail supports 96. It can appreciated that one of the stiffening rails 92 is interconnected to side rail 14 in the same matter as the other of the stiffening rails 92 is interconnected to side rail 12, and as such, the following description of the interconnection of a stiffening rail 92 to side rail 12 is understood to describe the interconnection of stiffening rail 92 to side rail 14 as if fully described hereinafter.

Referring to FIGS. 1 and 13–15, stiffening rails 92 have a generally t-shaped cross-section and a length substantially the same as the length of side rails 12 and 14. Each stiffening rail includes a horizontal leg 99 and a vertical leg 100 disposed at 90° to one another. Stiffening rails 92 may be composed of any suitable material, but is preferably steel having sufficient strength to discourage flexing of side rails 12 and 14. Vertical legs 100 of stiffening rails 92 have a longitudinally extending v-shaped grooves 102 formed in one side thereof. The opposite sides of vertical legs 100 define planar faces which bear or abut against the outer faces 104 of clamp pieces 101 of stiffening rail supports 96, as illustrated. Stiffening rail supports 96 include v-shaped cuts 106 formed horizontally across outer faces 104.

Stiffening rail supports 96 further include c-shaped jaws 108 having a pair of opposite parallel legs 110 and 112, with legs 112 being slightly longer than legs 110. The terminal ends of legs 110 and 112 are rounded for engagement with corresponding v-shaped grooves 102 and v-shaped cuts 106, respectively. In order to interconnect a stiffening rail 92 to stiffening rail supports 96, screws 116 extend through corresponding walls 118 of c-shaped jaws 108 into bores in clamp pieces 101. Thus, as screws 116 are turned down in a clockwise direction, c-shaped jaws 108 are moved toward corresponding clamp pieces 101 so that legs 110 engage corresponding v-shaped groove 102 and legs 112 engage corresponding v-shaped cuts 106 until stiffening rail 92 is rigidly retained in position.

Clamp pieces 101 of stiffening rail supports 96 further include downwardly extending bolt-receiving bores 120 therethrough for receiving corresponding bolts 122. Bolts 122 extend into slot 34 in inner surface 36 of side rail 12. Each bore 120 defines an axis 124 disposed at an acute angle 126 with respect to outer face 104 of a corresponding clamp piece 101. Acute angle 126 may be anywhere between 1° and 89°, but is preferably between about 30° and about 80°, and is most preferably about 65° to match angle 40 of slot 34. Nuts are provided within the terminal end of the slot 34 in inner surface 36 of side rail 12 and threaded onto the shafts of bolts 122 so as to rigidly connect clamp pieces 101, and hence, stiffening rail supports 96 to side rail 12. In the assembled configuration, stiffening rails 92 stiffen side rails 12 and 14 to prevent any significant flexing thereof during a blanking operation.

In addition to outer face 104, each clamp piece 101 of stiffening rail support 96 is defined by flat vertically extending inner face 103, a horizontally extending upper face 105, an opposite horizontally extending lower face 107, and a pair of opposite end faces 109 and 111. Each clamp piece 101 also defines slot 113 that extends along the entire height of clamp piece 101 and opens to both upper face 105 and 107. Slot 113 is defined by a vertical rear surface 115 and first and second sidewalls 117 and 119, respectively. Sidewalls 117 and 119 extend from inner face 103 and diverge from each other.

Jogging element 121 is slidably received within slot 113. Jogging element 121 includes an upright plate member defining substantially flat, vertically extending inner face 123, a substantially flat oppositely vertically extending outer face 125, a horizontally extending upper face 127, an opposite horizontally extending lower face 129, and a pair of opposite end faces 131 and 133. End faces 131 and 133 diverge from each other as the end faces extend from inner face 123 to outer face 125. As described, end face 131 of jogging element 121 forms a slidable interface with sidewall 117, end face 133 of jogging element 121 forms a slidable interface with sidewall 119, and outer face 125 of jogging element 121 fonts a slidable interface with rear wall 115.

Jogging element 121 further includes wall 135 defining a generally oblong opening 137 to accommodate the portion of head 122a of bolt 122 that projects into slot 113. With jogging element 121 positioned within slot 113, jogging element 121 is slidable between a first raised position wherein lower face 129 of jogging element 121 is substantially flush with the lower face 107 of clamp piece 101 and wherein head 112a of bolt 122 engages lower portion 135a of wall 135 and a lowered position wherein lower face 107 of jogging element 121 is below lower face 107 of the upright plate member and bolt head 122a engages upper portion 135b of wall 135. Jogging element 121 provides an adjustable stop for a sheet being positioned horizontally over lower frame assembly 10.

Referring to FIG. 1, lower frame assembly 10 further includes inner grid 46 composed of a plurality of parallel lengthwise bars 130 extending in machine direction 20 between front cross rail 16 and rear cross rail 18, and a plurality of substantially parallel crosswise bars 132 extending transverse to machine direction 20 between left side rail 12 and right side rail 14. Bars 130 and 132 of inner grid 46 can be point welded or glued with adhesive at the points where they intersect to insure rigidity of inner grid 46. As hereinafter described, the opposite ends of bars 130 are attached to cross rails 16 and 18 by corresponding clamp devices 136. Likewise, the opposite ends of bars 132 are attached to side rails 12 and 14 by corresponding clamp devices 138. It should be noted that the present invention is not limited to the design of inner grid 46 illustrated in FIG. 1 and that the design provided is for illustrative purposes only. It can be appreciated that the profile of inner grid 46 may be changed depending upon the type, size and shape of the carton blank to be produced.

Referring to FIGS. 4–7, each clamp device 136 includes an upright plate member defining a substantially flat vertically extending inner face 140, a substantially flat opposite vertically extending outer face 142, a horizontally extending upper face 144, an opposite horizontally extending lower face 146, and a pair of opposite end faces 148 and 150. As described, clamp device 136 is generally rectangular in shape, although other geometric shapes are contemplated without deviating from the scope of the present invention.

Lip 152 is formed on outer face 142 of each clamp device 136. Lips 152 project at right angles to outer faces 142 and extend completely across outer faces 142 between end faces 148 and 150 of clamp devices 136. Lips 152 do not necessarily extend completely across outer faces 142 of clamp devices 136, but preferably do so to provide the maximum amount of clamping force against ledges 68 formed in inner surfaces 60 of cross rails 16 and 18.

A substantially u-shaped upper cavity 156 is formed in upper face 144 of each clamp device 136. Cavity 156 is defined by spaced sidewalls 158 and 160 and bottom wall 162. Sidewalls 158 and 160 extend vertically in planes parallel to end faces 148 and 150 and are disposed at a 90° angle with respect to inner face 140. Bottom wall 162 of each cavity 156 includes depression 164 therein that extends along an axis perpendicular to inner face 140 for receiving the lower edge 130a of bar 130 and for aiding in the alignment of bars 130, as hereinafter described. Cavity 156 includes a tear-dropped shaped portion 165 at the intersection of sidewall 160 and bottom wall 162.

Wedge members 166 are disposed within cavities 156 of clamp devices 136 for pivotable movement between a clamped position wherein clamping surfaces 168 of wedge members 166 engage and retain corresponding bars 130 in a user desired position and a released position wherein bars 130 may be removed from cavity 156. As illustrated, each wedge member 166 has upper and lower faces 170 and 172, respectively, spaced by clamping surface 168 and sides 174 and 176. Each clamping surface 168 is generally arcuate having an apex for engaging a corresponding bar 130. Each wedge member 166 also includes pivoting element 178 having a tear-drop shaped cross section that is pivotably receivable within portion 165 of a corresponding cavity 156. Each pivoting element 178 of wedge members 166 extends from and is contiguous with upper and lower faces 170 and 172, respectively, and sides 174 and 176. Threaded apertures 180 extend through wedge members 166 between the upper and lower faces 170 and 172, respectively, thereof. Bolts 182 extend though corresponding apertures 180 in wedge members 166 and into corresponding bores 184 formed in bottom walls 162 of clamp devices 136 so as to interconnect wedge members 166 and corresponding clamp devices 136.

It can be appreciated that as bolts 182 are turned down in a clockwise direction, wedge members 166 pivot on pivoting elements 178 toward their clamped positions. Clamping surfaces 168 of wedge members 166 function to engage bars 130 provided in depressions 164 to exert the necessary clamping force to retain bars 130 in position between sidewalls 158 and clamping surfaces 168 of wedge members 166 as wedge members 166 pivot downwardly into cavities 156. To release bars 130, bolts 182 are turned in a counter-clockwise direction until wedge members 166 pivot away from corresponding bars 130 to release the clamping pressure applied thereto so that bars 130 can be removed from cavities 156.

In order to attach clamp devices 136 to cross rails 16 and 18, rectangular recesses 190 are formed in inner faces 140 to define inner walls 192. Downwardly and outwardly extending bolt-receiving bores 194 extend through inner walls 192. Each bore 194 extends along axis disposed at an acute angle with respect to outer face 142. The acute angle may be anywhere between 1° and 89°, but is preferably between about 30° and about 80°, and is most preferably about 65° to match the angle 66 defined by slot 62 in a corresponding cross rail 16 or 18. Bolts 198 extend through corresponding bores 194 into nuts (not shown) captured within slots 62. As bolts 198 are tightened, lips 152 are pulled tightly against corresponding ledges 68 of cross rails 16 and 18 while at the same time outer faces 142 are forced to bear tightly against corresponding inner faces 60 of cross rails 16 and 18 to rigidly hold clamp devices 136 in position on cross rails 16 and 18.

Referring to FIGS. 16–19, it can be appreciated that clamp devices 138 perform the dual function of interconnecting stiffening rails 92 to corresponding side rails 12 and 14, as well as, interconnecting the ends of bars 132 to side rails 12 and 14. Each clamp device 138 includes an upright plate member that defines substantially flat, vertically extending inner face 200, a substantially flat opposite vertically extending outer face 202, a horizontally extending upper face 204, an opposite horizontally extending lower face 206, and a pair of opposite end faces 208 and 210. As described, clamp device 138 is generally rectangular in shape, although other geometric shapes are contemplated depending upon the end use of clamp device 138.

Each clamp device 138 further includes a c-shaped jaw 212 having a pair of oppositely parallel legs 214 and 216, with a leg 216 being slightly longer than leg 214. The terminal ends of legs 214 and 216 are rounded for engagement with corresponding v-shaped grooves 102 formed in vertical legs 100 of stiffening rail 92 and v-shaped cuts 218 formed horizontally across outer faces 202 of clamp devices 138. In order to interconnect a stiffening rail 92 to clamp devices 138, screws 220 extend through corresponding walls 222 of c-shaped jaws 212 into bores 224 formed in outer faces 202 of clamp devices 138. As screws 220 are turned down in a clockwise direction, c-shaped jaws 212 are moved toward corresponding outer faces 202 of clamp devices 138 so that legs 214 engage corresponding v-shaped groove 102 in vertical leg 100 of stiffening rail 92 and legs 216 engage corresponding v-shaped cuts 218 until stiffening rail 92 is rigidly retained in position.

Lip 226 is formed on outer face 202 of each clamp device 138. Lips 226 project at right angles to outer faces 202 and extend completely across outer faces 202 between end faces 208 and 210 of clamp devices 138. Lips 226 do not necessarily extend completely across outer faces 202 of clamp devices 138, but preferably do so as to provide the maximum amount of clamping force against ledges 50 in side rails 12 and 14.

A substantially u-shaped upper cavity 228 is formed in upper face 204 of each clamp device 138. Cavity 228 is defined by spaced sidewalls 230 and 232 and bottom wall 234. Sidewalls 230 and 232 extend vertically in parallel planes and are disposed at right angles to inner face 200. Bottom wall 234 of each cavity 238 includes depression 236 therein that extends along an axis perpendicular to inner face 200 for receiving the lower edge 132a of bar 132 and for aiding the alignment of bars 132. Each cavity 228 includes a portion 238 having a tear-drop shaped cross section at the intersection of sidewall 232 and bottom wall 234.

Wedge members 240 are disposed within cavities 228 of clamp devices 138 for pivotable movement between a clamped position wherein clamping surfaces 242 of wedge members 240 engage and retain corresponding bars 132 in a user desired position and a released position wherein bars 132 may be removed from cavity 228. As illustrated, each wedge member 240 has upper and lower faces 244 and 246, respectively, spaced by clamping surface 242 and sides 248 and 250. Each clamping surface 242 is generally arcuate having an apex for engaging a corresponding bar 132. Each wedge member 240 also includes pivoting element 252 having a tear drop shaped cross section that is pivotably receivable within portion 238 of a corresponding cavity 228. Each pivoting element 252 of wedge members 240 extends from and continuous with upper and lower faces 244 and 246, respectively, and sides 248 and 250. Threaded apertures 254 extending through wedge members 240 between upper and lower faces 244 and 246, respectively, thereof. Bolts 256 extend through corresponding apertures 254 and wedge members 240 and into corresponding bores 258 formed in bottom walls 234 of clamp devices 138 so as to interconnect wedge members 240 and corresponding clamp devices 138.

It can be appreciated that as bolts 256 are turned down in a clockwise direction, wedge members 240 pivot on pivoting elements 252 toward their clamped positions. Clamping surfaces 242 of wedge members 240 function to engage bars 132 provided in depressions 234 to exert the necessary clamping force to retain bars 132 in position between sidewalls 204 and clamping surfaces 242 of wedge members 240 as wedge members 240 pivot downwardly into cavities 228. To release bars 132, bolts 256 are turned in a counterclockwise direction until wedge members 240 pivot away from corresponding bars 132 to release the clamping pressure applied thereto so that bars 132 can be removed from cavities 228.

In order to attach clamp devices 138 to side rails 12 and 14, rectangular recesses 260 are formed in inner faces 200 that define inner walls 262. Downwardly and outwardly extending bolt-receiving bores 264 extend through inner walls 262. Each bore 264 extends along an axis disposed on an acute angle with respect to outer face 202 of a corresponding clamp device 138. The acute angle may be anywhere between 1° and 89°, but is preferably between about 30° and about 80°, and is most preferably about 65° to match the angle 40 defined by slot 34 in a corresponding side rail 12 or 14. Bolts 266 extend through corresponding bores 264 into nuts (not shown) captured within slots 34. As bolts 266 are tightened, lips 226 are pulled tightly against corresponding ledges 50 of side rails 12 and 14 while at the same time outer faces 202 are forced to bear tightly against corresponding inner faces 36 of side rails 12 and 14 to rigidly hold clamp devices 138 in position on side rails 12 and 14.

Referring to FIGS. 20–24, an alternate clamp device is generally designed by the reference numeral 270. As hereinafter described, clamp device 270 may be used to attach the opposite ends of an alternate bar 272 to cross rails 16 or 18. Bar 272 takes the form of generally flat panel having first and second sides 274 and 276, first and second edges 278 and 280, respectively, and end 282. A generally cylindrical mounting pin 284 projects from end 282 of bar 272, for reasons hereinafter described.

Clamp device 270 includes an upright plate member defining a substantially flat, vertically extending inner face 284, a substantially flat opposite vertically extending outer face 286, a horizontally extending upper face 288, an opposite horizontally extending lower face 290, and a pair of opposite end faces 292 and 293. As described, clamp device 270 is generally rectangular in shape although other geometric shapes are contemplated about deviating from the scope of the present invention.

Lip 294 is formed on outer face 286 of clamp device 270. Lip 294 projects at a right angle to outer face 286 and extends completely across outer face 286 between end faces 292 and 293 of clamp device 270. Lip 294 does not necessarily extend completely across outer face 286 of clamp device 270, but preferably does so as to provide the maximum amount of clamping force against ledge 68 formed in inner surface 60 of cross rail 16.

Panel receiving slot 296 that extends along the entire height of clamp device 270 and opens to both upper face 288 and lower face 290. Slot 296 includes a first inner portion 296a defined by sidewalls 298a and 300a, and an outer portion 296b defined by sidewalls 298b and 300b. Outer portion slot 296 is further defined by a lower horizontal support surface 301 that is generally parallel to and positioned between upper and lower faces 288 and 290, respectively, of clamp device 270. As described, sidewalls 298a and 300a are spaced of sufficient dimension to allow end 282 of bar 272 to be inserted therebetween. Similarly, sidewalls 298b and 300b are spaced of sufficient dimension to allow pin 284 to be inserted therebetween. The intersection of sidewalls 298a and 298b define a shoulder 302 within slot 296 and the intersection of sidewalls 300a and 300b define shoulder 304 within slot 296. End 282 of bar 272 engages shoulders 302 and 304 when end 282 of bar 272 is fully inserted into slot 296 in clamp device 270. With end 282 of bar 272 fully inserted within slot 296 in clamp device 270, pin 284 is received within outer portion 296b of slot 296. It can be appreciated that pin 284 may be rested on support surface 301 to allow support surface 301 to vertically support bar 272.

In order to maintain bar 272 within slot 296 in clamp device 270, a set screw 306 extends through bore 308 formed in end face 292 of clamp device 270. Bore 302 communicates with inner portion 296a of slot 296. It can be appreciated that as set screw 306 is turned in a clockwise direction, the terminal end 306a of set screw 306 engages side 274 of bar 272 to exert the necessary clamping force to retain bar 272 in position within slot 296. To release bar 272, set screw 306 is turned in a counterclockwise direction until terminal end 306a of set screw 306 disengages from side 274 of bar 272 to release the clamping pressure applied thereto so that bar 272 can be removed from slot 296.

In order to attach clamp device 270 to cross rail 16, a downwardly and outwardly extending bolt receiving bore 307 extends through clamp device 270 between inner face 284 and outer face 286. Bore 298 extends along an axis disposed at an acute angle with respect to outer face 286. The acute angle may be anywhere between 1° and 89°, but preferably is between about 30° and 80°, and is most preferably about 65° to match the angle 66 defined by slots 62 in cross rail 16. Bolt 310 extends through corresponding bore 307 into a nut (not shown) captured within slot 62. As bolt 310 is tightened, lip 294 is pulled tightly against corresponding ledge 68 of cross rail 16 while at the same time outer face 286 is force to bear tightly against corresponding inner face 60 of cross rail 16 to rigidly hold clamping device 270 in position across rail 16.

Referring to FIGS. 8–12, a jogger is generally designated by the reference numeral 320. Jogger 320 is connectable to cross-rails 16 and 18 for aligning a sheet on inner grid 46 of lower frame assembly 10. Jogger 320 includes an upright plate member defining a substantially flat vertically extending inner face 322, a substantially flat opposite vertically extending outer face 324, a horizontally extending upper face 326, an opposite horizontally extending lower face 328, and a pair of opposite end faces 330 and 332. As described, jogger 320 is generally rectangular in shape, although other geometric shapes are contemplated without deviating from the scope of the present invention.

Lip 334 is formed in outer face 324 of jogger 320. Lip 334 projects at a right angle to outer face 324 and extends completely across outer face 324 between end faces 330 and 332 of jogger 320. Lip 334 does not necessarily extend completely across outer face 324 of jogger 320, but preferably does so as to provide the maximum amount of clamping force against ledge 68 formed in the inner surface 60 of cross rail 16. In addition, slot 336 extends along the entire height of jogger 320 and opens to both upper face 326 and lower face 328. Slot 336 is defined by a vertical rear surface 338 and first and second sidewalls 340 and 342, respectively. Sidewalls 340 and 342 extend from inner face 322 and diverge from each other.

In order to attach jogger 320 to cross rail 16, a downwardly and outwardly extending bolt receiving bore 344 extends through jogger 320 between rear wall 338 and outer face 324. Bore 344 extends along an axis 346 disposed at an acute angle with respect to outer face 324. The acute angle may be anywhere between 1° and 89°, but preferably is between about 30° and 80°, and is most preferably about 65° to match the angle 66 defined by slot 62 in cross rail 16. Bolt 348 extends through corresponding bore 344 into nut 350 captured within slot 62. As bolt 348 is tightened, lip 334 is pulled tightly against corresponding ledge 68 of cross rail 16 while at the same time outer face 324 is forced to bear tightly against corresponding inner face 60 of cross rail 16 to rigidly hold jogger 320 in position against cross rail 16. With bolt 348 threaded in bore 344, a portion of head 348a of bolt projects into slot 336.

Jogger 320 further includes jogging element 352 that is slidably received within slot 336. Jogging element 352 includes an upright plate member defining substantially flat, vertically extending inner face 354, a substantially flat oppositely vertically extending outer face 356, a horizontally extending upper face 358, an opposite horizontally extending lower face 360, and a pair of opposite end faces 362 and 364. End faces 362 and 364 diverge from each other as the end faces extend from inner face 354 to outer face 356. As described, end face 362 of jogging element 352 forms a slidable interface with sidewall 340, end face 364 of jogging element 352 forms a slidable interface with sidewall 342, and outer face 356 of jogging element 352 forms a slidable interface with rear wall 338.

Jogging element 352 further includes wall 370 defining a generally oblong opening 366 to accommodate the portion of head 348a of bolt 348 that projects into slot 336. With jogging element 352 positioned within slot 336, jogging element 352 is slidable between a first raised position wherein lower face 360 of jogging element 352 is substantially flush with the lower face 328 and wherein head 348a of bolt 348 engages lower portion 370a of wall 370 and a lowered position wherein lower face 360 of jogging element 352 is below lower face 328 of the upright plate member and bolt head 348a of bolt 348, engages upper portion 370b of wall 370. Jogging element 352 provides an adjustable stop for a sheet being positioned horizontally over lower frame assembly 10.

Figure 25:
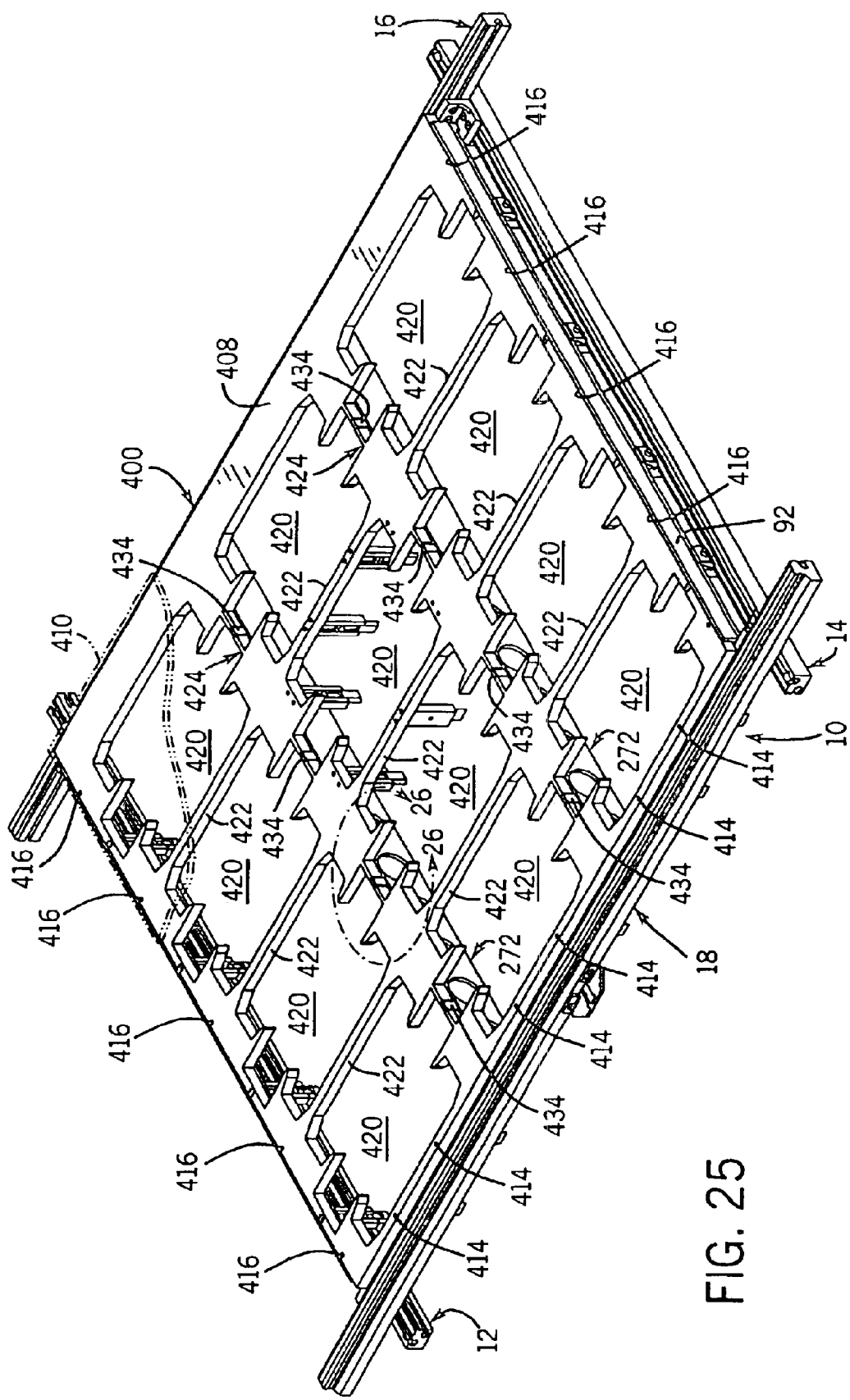
FIG. 25 is an isometric view of a lower frame assembly for a blanking tool of a carton die cutting machine having a grid element mounted thereon.
Figure 26:
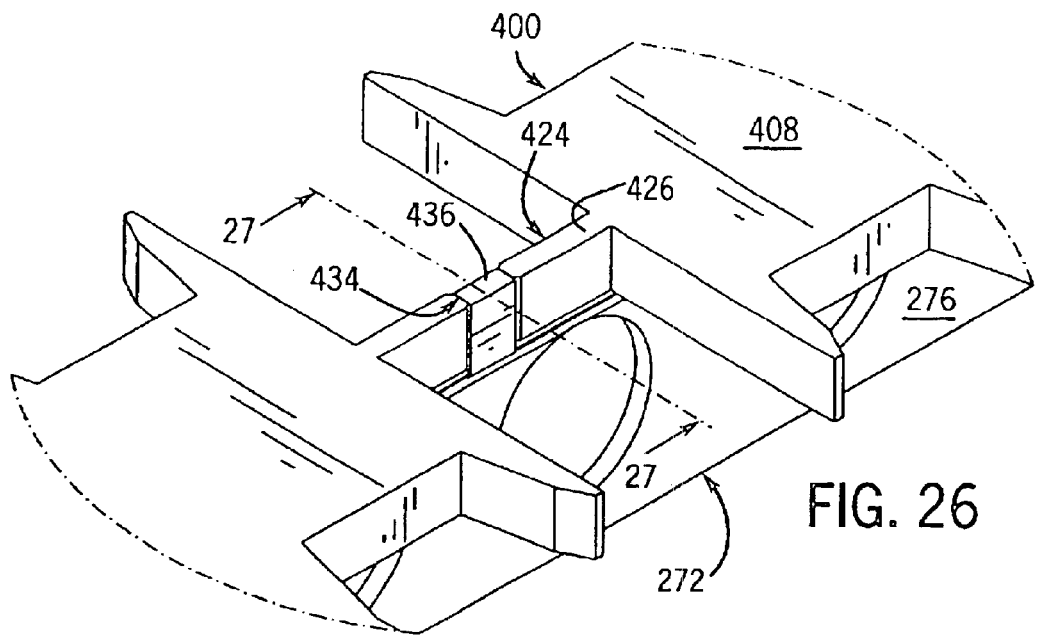
FIG. 26 is an enlarged isometric view of the lower frame assembly taken along line 26—26 of FIG. 25.
Figure 27:
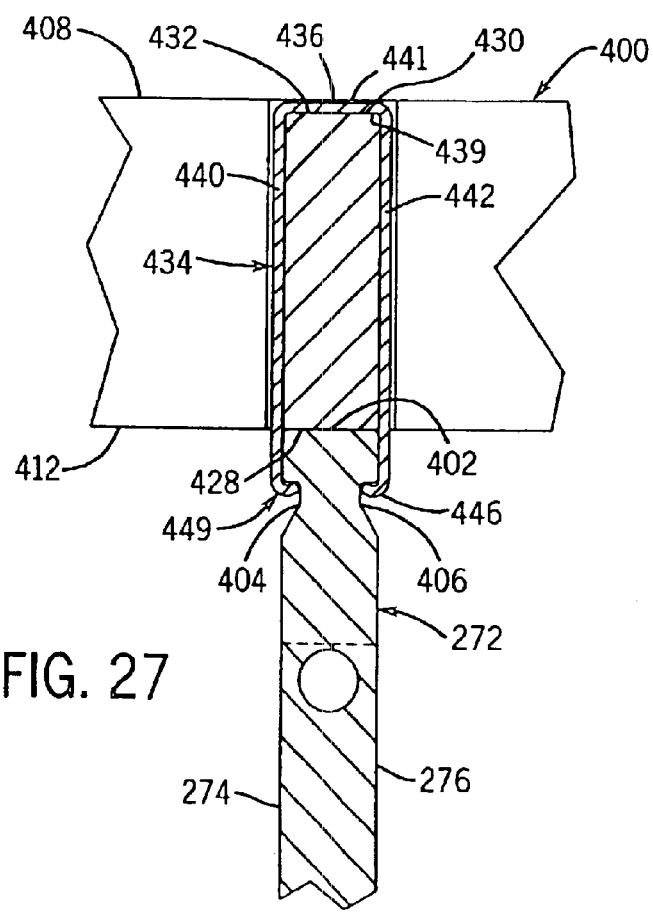
FIG. 27 is a cross-sectional view of the lower frame assembly taken along line 27—27 of FIG. 25.
Figure 28:
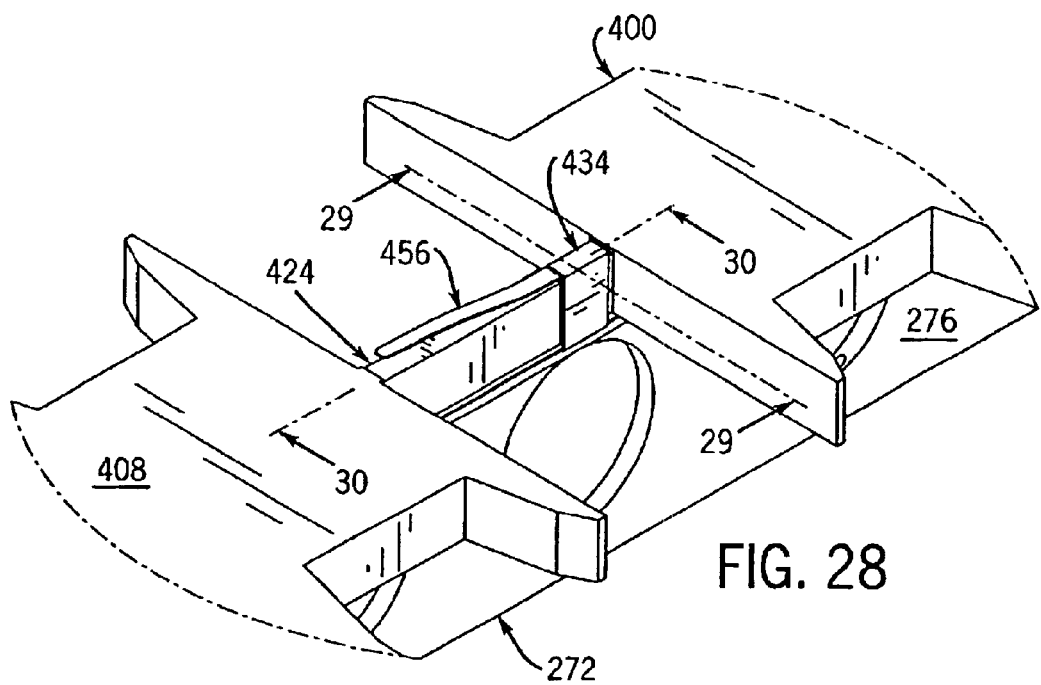
FIG. 28 is an isometric view of the lower frame assembly, similar to FIG. 26, showing an alternate connector for interconnecting the grid element to the lower frame assembly.
Figure 29:
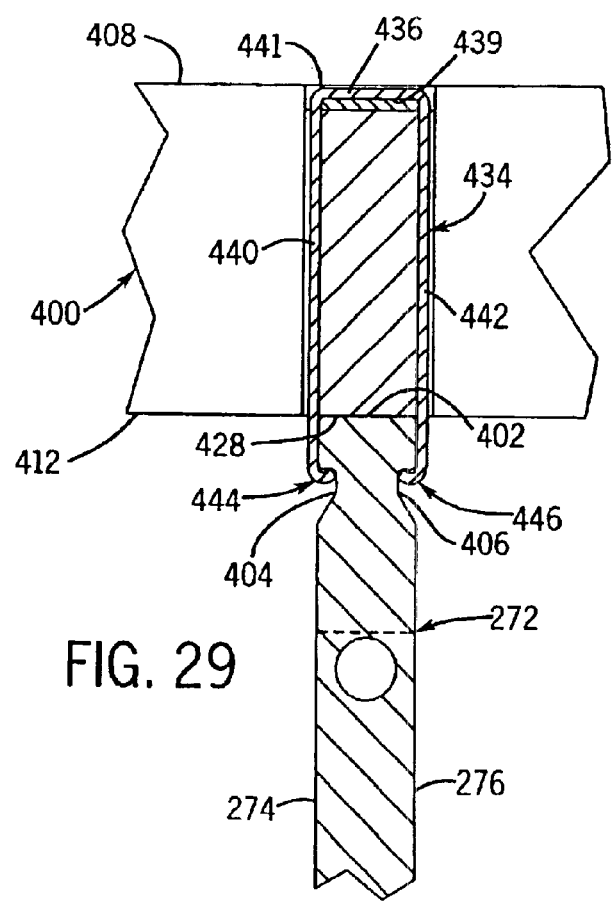
FIG. 29 is a cross-sectional view of the lower frame assembly taken along line 29—29 of FIG. 28.
Figure 30:
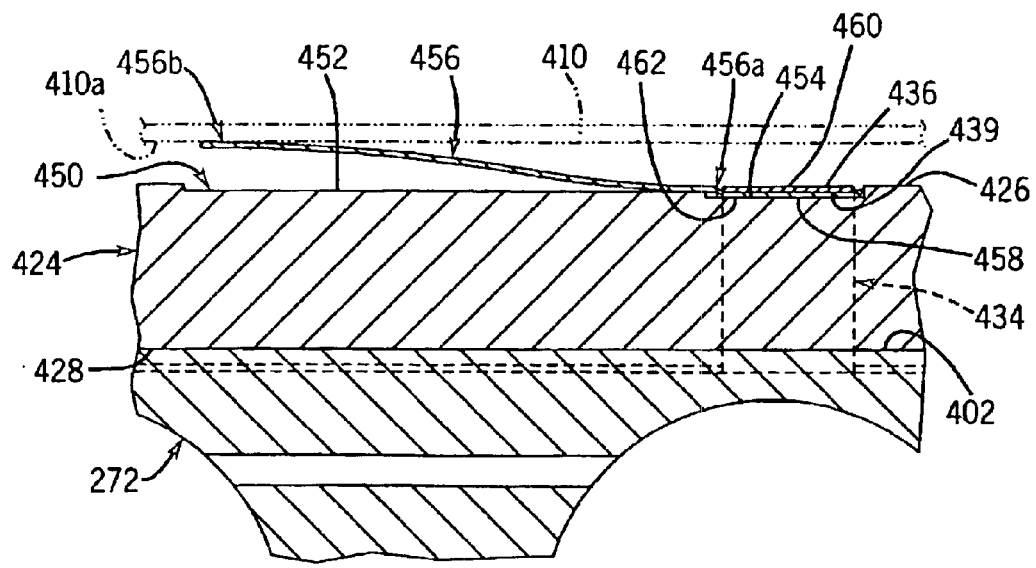
FIG. 30 is a cross-sectional view taken along line 30—30 of FIG. 28 showing, a scrap portion of a carton blank being raised above the lower frame assembly.
Figure 31:
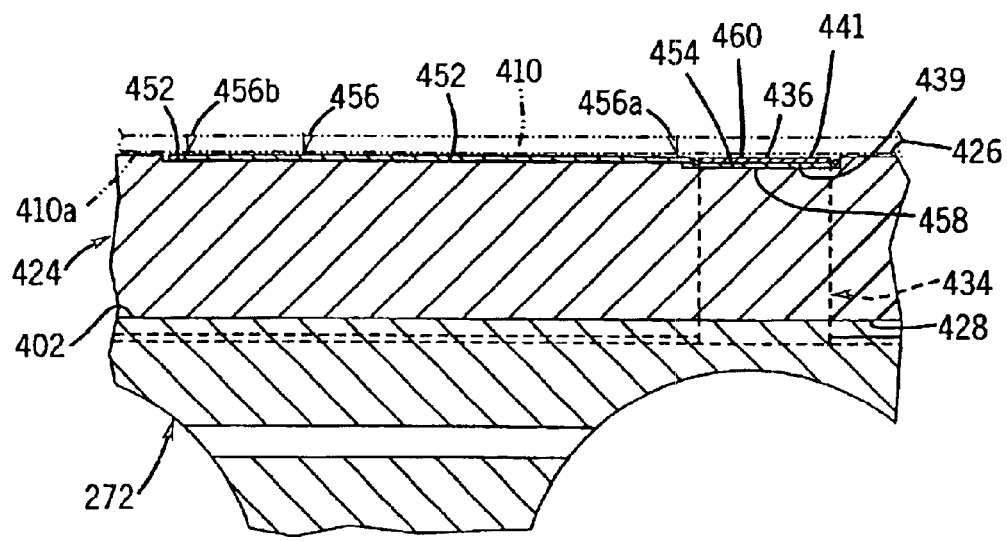
FIG. 31 is a cross-sectional view, similar to FIG. 30, showing a sheet of paper material deposited on the lower frame assembly.

Referring to FIGS. 25–27, it is contemplated to mount grid element 400 on lower frame assembly 10. As heretofore described, lower frame assembly 10 includes an outer frame comprised of a pair of opposite, spaced apart longitudinally extending side frame members or side rails 12 and 14, and a pair of opposite, spaced apart cross frame members or cross rails 16 and 18 extending crosswise between side rails 12 and 14. Bars 272 extend between and are interconnected to cross rails 14 and 16, as heretofore described. Each bar 272 extends along a corresponding longitudinal axis and includes an upper surface 402 for receiving grid element 400 thereon. In addition, each bar 272 includes longitudinally extending grooves 404 and 406 formed in corresponding sides 274 and 276, respectively, for reasons hereinafter described.

Grid element 400 is generally rectangular and adapted for receipt on lower frame assembly 10. Grid element 400 includes an upper face 408 for receiving a sheet of paper material 410 thereon, and a lower face 412. The outer periphery of grid element 400 overlaps side rails 12 and 14 and cross rails 16 and 18. It is contemplated to interconnect grid element 400 to side rails 16 and 18 with a plurality of spaced screws 414. Similarly, grid element 400 may be interconnected to stiffening rails 92 by a plurality of spaced screws 416.

Grid element 400 includes a plurality of openings 420 therethrough arranged in rows and columns. Openings 420 have a shape corresponding to the desired shape of the carton blank to be cut from the sheet of paper material 410 to allow the carton blank to pass therethrough. Grid element 400 includes a plurality of separation elements 422 that are generally parallel to crossrails 16 and 18. Separation elements separate adjacent pairs of openings 420 in adjacent rows. In addition, grid element 400 includes supporting elements 424 that are generally parallel to side rails 12 and 14 and that separate adjacent columns of openings 420. Supporting elements 424 overlap corresponding bars 272 and include upper surfaces 426 that are coplanar with upper face 408 of grid element 400, FIGS. 26 and 27. Supporting elements 424 also include lower surfaces 428 that are coplanar with lower face 412 of grid element 400 and engageable with upper surfaces 402 of corresponding bars 272. A plurality of axially spaced recesses 430 are provided in upper surfaces 426 of each supporting element 424 of grid element 400. Each recess 430 has a predetermined length and width generally equal to the width of bars 272. Each recess 430 is partially defined by a recessed surface 432 that is vertically spaced from a corresponding upper surface 426 of supporting elements 424 of grid element 400.

Grid element 400 is interconnected to bars 272 by connection elements 434. Each connection element 434 includes base 436 having opposite sides and opposite ends. It is contemplated that the length of base 436 of each connection element 434 be generally equal to the length of each recess 430 in upper surfaces 426 of supporting elements 424 of grid element 400 and that the width of base 436 of each connection element 434 be generally equal to the width of each supporting element 424 of grid element 400. In addition, it is contemplated that base 436 of each connection element 434 include inner surface 439 and outer surface 441 defining a thickness of base 436. The thickness of each base is generally equal to the depth of each recess 430.

Connecting arms 440 and 442 depend from opposite sides of base 436 of each connection element 434. Connecting arms 440 and 442 include terminal ends 444 and 446, respectively, having a generally hooked configurations adapted for receipt in corresponding grooves 404 and 406 in sides 274 and 276, respectively, of bars 272. It is contemplated that connecting arms 440 and 442 be resiliently connected to the sides of base 436 of each connection element 434 such that the connection arms are movable between a first open position wherein each connection element 434 may be positioned over a corresponding supporting element 434 of grid element 400 and a second connecting position wherein terminal ends 444 and 446 of connecting arms 440 and 442, respectively, of each connection device 434 may be received in corresponding grooves 404 and 406 in side walls 274 and 276, respectively, of bars 272. In the preferred embodiment, connecting arms 440 and 442 of each connection element 434 are biased toward their connecting positions.

In operation, connection arms 440 and 442 of each connection element 434 are moved to the open position and placed over a corresponding recess 430 in upper surfaces 426 of each supporting element 424 of grid element 400. Connection elements 434 are moved downwardly such that bases 436 of connection elements 434 become seated within recesses 430 in upper surfaces 426 of supporting elements 424 of grid element 400. Connecting arms 440 and 442 of connection elements 434 are released and urged to the connecting position wherein terminal ends 444 and 446 of connection arms 440 and 442, respectively, become seated in corresponding grooves 404 and 406 in side walls 274 and 276, respectively, of bars 472, thereby interconnecting grid element 400 to bars 272. In its assembled configuration, outer surfaces 441 of bases 436 of connection elements 434 are generally co-planar with upper surfaces 426 of supporting elements 424. Inner surfaces 439 of bases 436 of connection elements 434 engage recessed surfaces 432 that partially define recesses 430 in upper surfaces 426 of supporting elements 424. In addition, connecting arms 440 and 442 of each connecting element 434 engage opposite sides of corresponding supporting elements 424 of grid element 400 to prevent the lateral movement thereof.

Referring to FIGS. 28–31, alternate recesses 450 are provided in upper surfaces 426 of supporting elements 424. Recesses 450 in upper surfaces 426 of supporting elements 424 include first portions partially defined by recessed surfaces 452 that are vertically spaced from corresponding upper surfaces 426 of supporting elements 424 of grid element 400 and second portions partially defined by recessed surfaces 454 that are vertically spaced from corresponding upper surfaces 426 of supporting elements 424 of grid element 400. First portions of recesses 450 are adapted to receive corresponding flyers 456, for reasons hereinafter described. Second portions of recesses 450 receive corresponding bases 436 of connection elements 434, as well as, flyer connectors 458.

Each flyer connector 458 includes an upper surface 460 interconnected to inner surface 439 of a corresponding base 436 and a lower surface 462 engageable with a corresponding recessed surface 454. Each flyer 456 has a first end 456a interconnected to upper surface 460 of a corresponding flyer connector 458 adjacent the first end thereof and a second free end 456b. Free end 456b of each flyer 456 is movable between a first biased position wherein end 456b of each flyer 456 is spaced from a corresponding recessed surface 452, FIG. 30, and a non-biased position wherein each flyer 456 is seated within a corresponding recess 450 in upper surfaces 426 of supporting elements 424, FIG. 31.

In operation, connecting arms 440 and 442 of each connection element 434 are moved to the opened position and placed over a corresponding second portion of recess 450 in upper surfaces 426 of each supporting element 424 of grid element 400. Connection elements 434 move downwardly such that bases 436 of each connection element become seated within corresponding second portions of recesses 450 in upper surfaces 426 of supporting elements 424 of grid element 400 and such that lower surfaces 462 of flyer connectors 458 engage corresponding recessed surfaces 454. Connecting arms 440 and 442 of each connection element 434 are released and urged into their connecting positions wherein terminal ends 444 and 446 of connecting arms 440 and 442, respectively, become seated in corresponding grooves 404 and 406 and sidewalls 274 and 276, respectively, of bars 272, thereby interconnecting grid element 400 to bars 272. In its assembled configuration, outer surfaces 441 of bases 436 of connecting elements 434 are generally co-planar with upper surfaces 426 of supporting elements 424 and fire ends 456b of flyers 456 are vertically spaced from upper surfaces 426 of supporting elements 424. In addition, connecting arms 440 and 442 of each connecting 434 engage opposite sides of corresponding supporting elements 424 of grid element 400 to prevent the lateral movement thereof.

A sheet of paper material 410 is placed on upper surface 408 of grid element 400. The lower surface 410a of the sheet engages the flyers 456 so as to urge the flyers into corresponding recesses 450 in upper surfaces 426 of supporting elements 424, FIG. 31. Thereafter, an upper tool is used in combination with lower frame assembly 10 to knock the carton blanks from the sheet of paper material 410 through openings 420 in grid element 400 while the scrap material is retained on grid element 400. Once the upper tool is withdrawn from lower frame assembly 10, flyers 456 raise the scrap portion of the sheet of paper material 410 off upper surface 408 of grid element 400 so as to prevent the scrap material from getting caught on grid element 400 when being removed from lower frame assembly 10.

Figure 32:
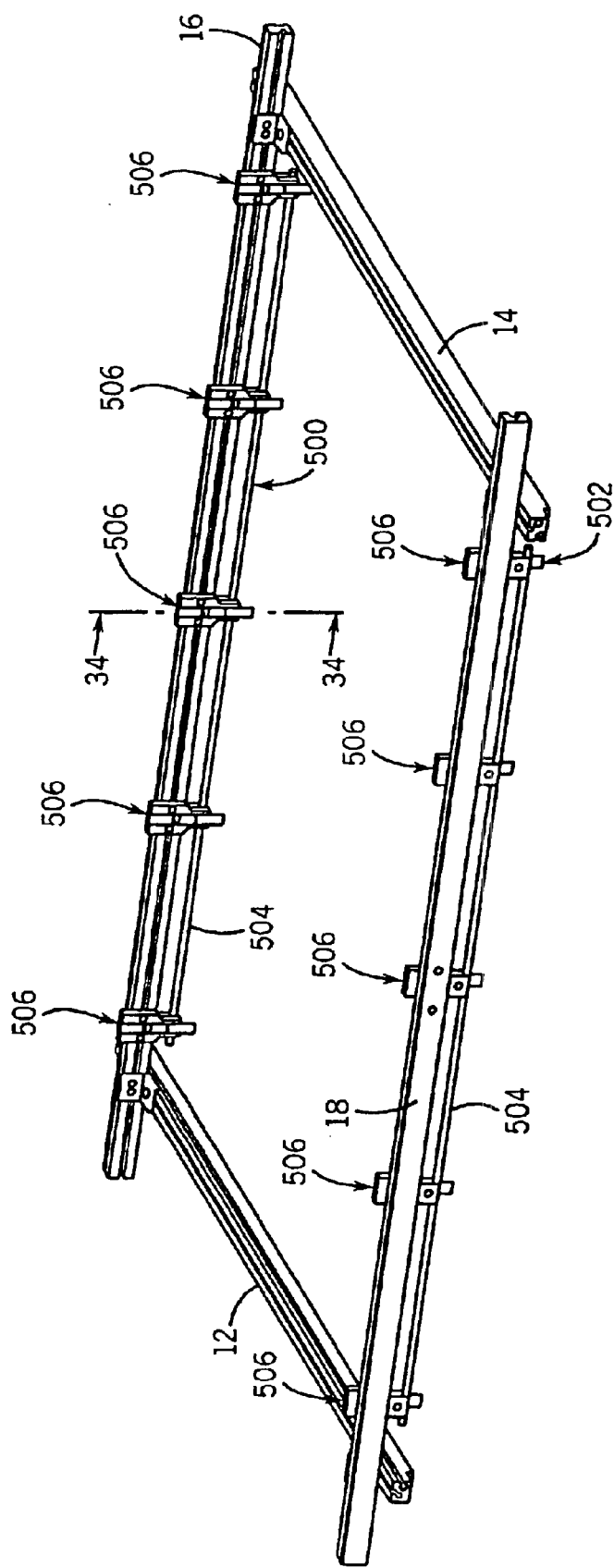
FIG. 32 is an isometric view of the outer frame of the lower frame assembly incorporating the stiffening assembly of the present invention.
Figure 33:
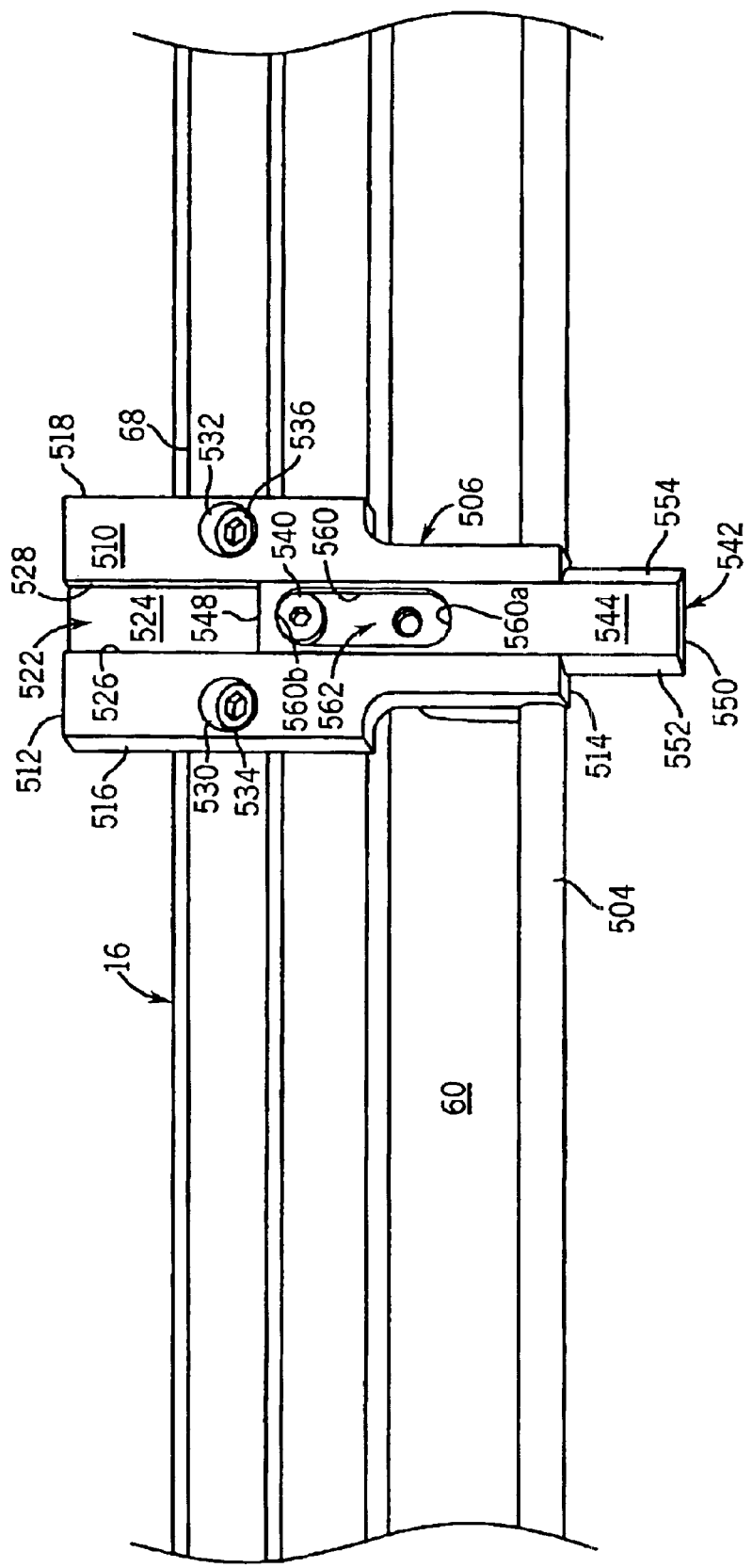
FIG. 33 is a front elevational view of a portion of the stiffening assembly of the present invention.
Figure 34:
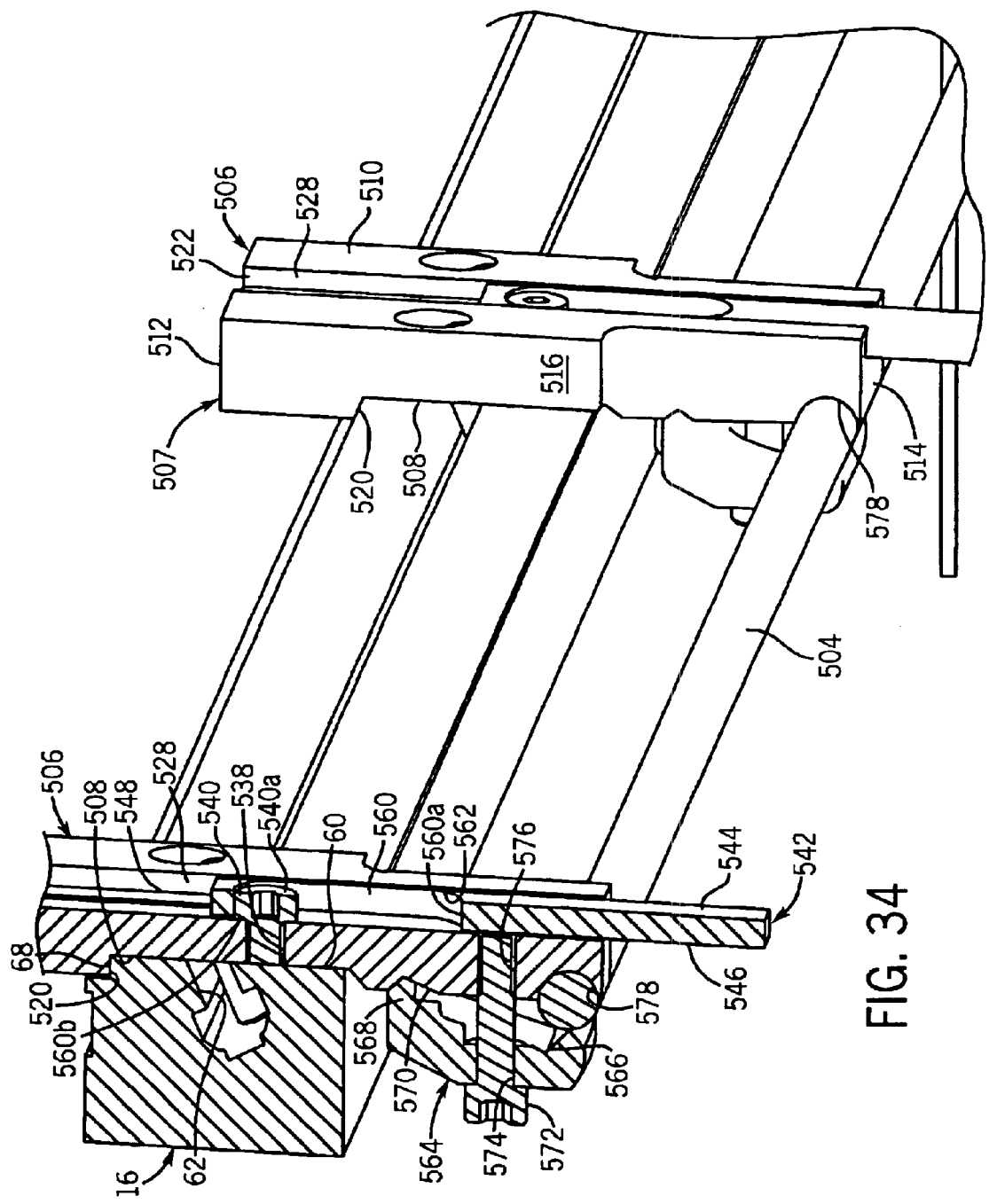
FIG. 34 is a cross-sectional view of a lower frame assembly taken along line 34—34 of FIG. 32.

Referring to FIGS. 32–34, in order to further increase the overall strength and stability of lower frame 10, it is contemplated to interconnect stiffening assemblies 500 and 502 to corresponding cross rails 16 and 18, respectively. It can be appreciated that the stiffening assembly 500 interconnected to cross rail 16 is identical in structure to the stiffening assembly 502 interconnected to cross rail 18. As such, the following description of stiffening assembly 500 to cross rail 16 is understood to describe the interconnection and structure of stiffening assembly 502 mounted to cross rail 18, as if fully described hereinafter.

Stiffening assembly 500 includes an elongated stiffening rod 504 operatively connected to corresponding cross rails 16 by a plurality of stiffening rod supports 506 such that stiffening rod 504 is vertically spaced and generally parallel to cross rail 16. Each stiffening rod support 506 includes upright plate member 507 defining a substantially flat vertically extending outer face 508, a substantially flat opposite vertically extending inner face 510, a horizontally extending upper face 512, an opposite horizontally extending lower face 514, and a pair of opposite end faces 516 and 518. As described, the plate member is generally rectangular in shape, although other geometric shapes are contemplated without deviating from the scope of the present invention.

Lip 520 is formed in outer face 508 of plate member 507. Lip 520 projects at a right angle to outer face 508 and extends completely across outer face 508 between end faces 516 and 518 of plate member 507. Lip 520 does not necessarily extend completely across outer face 508 of plate member 507, but preferably does so as to provide the maximum amount of clamping force against ledge 68 formed in the inner surface 60 of cross rail 16. Slot 522 extends along the entire height of plate member 507 and opens to both upper face 512 and lower face 514 of plate member 507. Slot 522 is defined by vertical rear surface 524 and first and second side walls 526 and 528, respectively. Sidewalls 526 and 528 of plate member 507 extend from inner face 510 thereof and diverge from each other.

In order to attach plate member 507 of cross rail 16, downwardly and outwardly extending bolt receiving bores 530 and 532 extend through plate member 507 between inner face 510 and outer face 508 of plate member 507. Bores 530 and 532 extend along corresponding axes disposed at acute angles with respect to outer face 508. The acute angles may be anywhere between 1° and 89°, but preferably are between about 30° and 80°, and are most preferably about 65° to match the angle 66 defined by slot 62 in cross rail 16. Bolts 534 and 536 extend through corresponding bores 530 and 532, respectively, into slot 62 wherein nuts are threaded thereon. As bolts 534 and 536 are tightened, the lip 520 of plate member 507 is pulled tightly against corresponding ledge 68 of cross rail 16 while at the same time outer face 508 is forced to bear tightly against corresponding inner face 60 of cross rail 16 to rigidly hold plate member 507 in position against cross rail 16.

Plate members 507 of stiffening rod supports 506 also include additional bores 538 extending between rear walls 524 and outer faces 508. Bolts 540 extends through corresponding bores 538 in plate members 507 such that heads 540a of bolts 540 project into slots 522. Jogging element 542 is slidably received within corresponding slot 522. Each jogging element 542 is defined by a substantially flat, vertically extending inner face 544, a substantially flat, oppositely vertically extending outer face 546, a horizontally extending upper face 548, an opposite horizontally extending lower face 550, and a pair of opposite end faces 552 and 554. End faces 552 and 554 diverge from each other as the end faces extend from inner face 544 to outer face 546 of jogging element 542. As described, end face 552 of jogging element 542 forms a slidable interface with side wall 526, end face 554 of jogging element 542 forms a slidable inner face with side wall 528, and outer face 546 of jogging element 542 forms a slidable interface with rear wall 524 of plate member 507.

Jogging element 542 further includes wall 560 defining a generally oblong opening 562 to accommodate head 540a of bolt 540 that projects into slot 522 of plate member 507. With jogging element 542 positioned within slot 522, jogging element 542 is slidable between a first raised position wherein lower face 550 of jogging element 542 is substantially flush with lower face 514 of plate member 507 and wherein head 540a of bolt 540 engages lower portion 560a of wall 560, and a lowered position wherein lower face 550 of jogging element 542 is below lower face 514 of plate member 507 and bolt head 540a of bolt 540 engages upper portion 560b of wall 560. As is conventional, jogging element 542 provides an adjustable stop for a sheet being positioned horizontally over lower frame assembly 10.

Stiffening rod support 506 further includes c-shaped jaw 564 having a pair of opposite parallel legs 566 and 568, with leg 568 being slightly longer then leg 566. The terminal ends of legs 566 and 568 are rounded. It is contemplated that terminal end of leg 568 be adapted for engagement with corresponding V-shaped slot 570 in outer face 508 of plate member 507. In order to interconnect c-shaped jaw 564 to plate member 507, bolt 572 extends through a corresponding aperture 574 in c-shaped jaw 564 and into threaded aperture 576 extending between outer face 508 and inner face 510 of plate member 507. It can be appreciated that as bolt 572 is turned in a clockwise direction, c-shaped jaw 564 is moved toward plate member 507.

In order to interconnect stiffening rod 504 to cross rail 16, a plurality of stiffening rod supports 506 are axially spaced and are interconnected to cross rail 16 as heretofore described. Support rod 504 is positioned against outer faces 508 of plate members 507 of stiffening rod support 506 such that stiffening rod 504 becomes seated within corresponding semi-cylindrical indentations 578 in outer faces 508 of plate members 507. Thereafter, bolts 572 of each stiffening rod supports 506 are turned in a counterclockwise direction such that legs 566 of c-shaped jaws 564 engage stiffening rod 504 and such that legs 568 of c-shaped jaws 564 become seated within corresponding v-shaped slots 570 in outer faces 508 of plate members 507. Bolts 574 are tightened to such a point that stiffening rod 504 is rigidly retained in position. In the assembled configuration, stiffening rods 504 stiffen cross rails 16 and 18 and prevent any significant flexing thereof during a blanking operation.

Various modes of carrying out the invention are contemplated as being within the scope of the following claims particularly pointing and distinctly claiming the subject matter that is regarded as the invention.

I claim:

1. A stiffening assembly for stiffening an outer frame for a lower blanking tool of a carton die cutting machine to discourage the flexing thereof, comprising:
    an elongated rod;
    a clamp piece defining a vertically extending inner face, an opposite vertically extending outer face, and a bore extending between the inner face and the outer face along an axis at an acute angle to the outer face; and
    a jaw element operatively connected to the clamp piece so as to define a clamping cavity therebetween, the jaw element being movable between a clamping position for retaining the elongated rod in the clamping cavity and a release position.

2. The stiffening assembly of claim 1 wherein the jaw element includes a first clamping surface engageable with the elongated rod when the jaw element is in the clamping position.

3. The stiffening assembly of claim 2 wherein the jaw element includes a second clamping surface engageable with the clamping piece when the jaw element is the clamping position.

4. The stiffening assembly of claim 3 wherein the second clamping surface of the jaw element is generally arcuate and includes an apex.

5. The stiffening assembly of claim 2 wherein the first clamping surface of the jaw element is generally arcuate and includes an apex.

6. The stiffening assembly of claim 1 further comprising a screw member for moving the jaw element between the clamping and release positions.

7. The stiffening assembly of claim 1 wherein the acute angle is in the range of 30° and 80°.

8. The stiffening assembly of claim 1 wherein the acute angle is approximately 65°.

9. The stiffening assembly of claim 1 wherein the outer face of the clamp piece includes a lip, the lip engageable with a corresponding ledge along the outer frame to support the clamp piece thereon.

10. The stiffening assembly of claim 1 further comprising a fastening element extending through the bore through the clamp piece and receivable in a corresponding slot in the outer frame to interconnect the clamp piece to the outer frame.

11. The stiffening assembly of claim 1 wherein the inner face of the clamp piece defines a recessed slot therein and wherein the stiffening assembly further comprises a jogger slidably disposed in the recessed slot in the inner face of the clamp piece.

12. The stiffening assembly of claim 1 wherein the outer face of the clamp piece includes a semi-cylindrical indentation for receiving a portion of the elongated rod therein.

13. A stiffening assembly for stiffening an outer frame for a lower blanking tool of a carton die cutting machine to discourage the flexing thereof, comprising:

an elongated stiffening member;

a plate member defining inner and outer faces and a bore extending between the inner face and the outer face along an axis at an acute angle to the outer face; and a clamping structure operatively connected to the plate member and being movable between a clamping position for rigidly retaining a portion of the stiffening member against the plate member and a release position.

14. The stiffening assembly of claim 13 wherein the inner face of the plate member defines a recessed slot therein and wherein the stiffening assembly further comprises a jogger slidably disposed in the recessed slot in the inner face of the plate member.

15. The stiffening assembly of claim 13 wherein clamping structure includes a jaw element having:

a first clamping surface engageable with the stiffening member with the clamping structure in the clamping position; and a second clamping surface engageable with the plate member with the clamping structure in the clamping position.

16. The stiffening assembly of claim 15 wherein the first and second clamping surfaces of the jaw element are generally arcuate and include apexes.

17. The stiffening assembly of claim 13 further comprising a screw member for moving the clamping structure between the clamping and release positions.

18. The stiffening assembly of claim 13 wherein the acute angle is in the range of 30° and 80°.

19. The stiffening assembly of claim 18 wherein the acute angle is approximately 65°.

20. The stiffening assembly of claim 13 wherein the outer face of the plate member includes a lip, the lip engageable with a corresponding ledge along the outer frame to support the plate member thereon.

21. A frame assembly for a lower blanking tool of a carton die cutting machine, comprising:

a rigid outer frame having a slot therein;

a stiffening member extending along an axis and being generally parallel to at least a portion of the outer frame; and a stiffening member support for interconnecting the stiffening member to the outer frame, the stiffening member support including:

a plate member defining inner and outer faces and a bore extending between the inner face and the outer face along an axis at an acute angle to the outer face;

a clamping structure operatively connected to the plate member and being movable between a clamping position for rigidly retaining a portion of the stiffening member against the plate member and a release position; and a fastening element extending through the bore in the plate member and receivable in the slot in the outer frame to interconnect the plate member to the outer frame.

22. The frame assembly of claim 21 wherein the acute angle is in the range of 300° and 80°.

23. The frame assembly of claim 21 wherein the acute angle is approximately 65°.

24. The frame assembly of claim 21 wherein the inner face of the plate member defines a recessed slot therein and wherein the stiffening member support further comprises a jogger slidably disposed in the recessed slot in the inner face of the plate member.

25. The frame assembly of claim 24 wherein clamping structure includes a jaw element having:

a first clamping surface engageable with the stiffening member when the clamping structure is the clamping position; and a second clamping surface engageable with the plate member when the clamping piece is in the clamping position.

26. The frame assembly of claim 25 wherein the first and second clamping surfaces of the jaw element are generally arcuate and include apexes.

27. The frame assembly of claim 21 wherein the outer face of the plate member includes a semi-circular indentation for receiving a portion of the stiffening member therein.

* * * * *